(12) United States Patent
Pershan et al.

(10) Patent No.: US 6,823,057 B1
(45) Date of Patent: Nov. 23, 2004

(54) METHODS AND APPARATUS FOR NOTIFYING SUBSCRIBER'S OF FORWARDED CALLS

(75) Inventors: Barry Paul Pershan, Olney, MD (US); Phil Biedronski, Baltimore, MD (US); Michael W. McKeehan, Silver Spring, MD (US); Joseph Mitchell West, Fredericksburg, VA (US)

(73) Assignee: Verizon Network Services Inc., Arlington, VA (US)

( * ) Notice: Subject to any disclaimer, the term of this patent is extended or adjusted under 35 U.S.C. 154(b) by 387 days.

(21) Appl. No.: 09/607,887

(22) Filed: Jun. 30, 2000

(51) Int. Cl.[7] .............................................. H04M 3/42
(52) U.S. Cl. ............................. 379/211.02; 379/207.05; 379/207.08; 379/201.01; 379/201.02; 379/221.08
(58) Field of Search ....................... 379/201.01, 201.02, 379/201.03, 211.01, 211.02, 214.01, 221.08, 221.09, 230, 373.01, 373.02, 373.03, 375.01, 418, 911, 207.16, 207.02, 207.05, 207.08

(56) References Cited

U.S. PATENT DOCUMENTS

| 4,646,347 A | * | 2/1987 | Liu ........................ 379/375.01 |
| 4,686,701 A | * | 8/1987 | Ahmad et al. ......... 379/221.03 |
| 4,768,224 A | * | 8/1988 | Waldman ............... 379/207.16 |
| 4,782,518 A | * | 11/1988 | Mattley et al. ........ 379/207.16 |
| 5,583,564 A | * | 12/1996 | Rao et al. ................. 348/14.01 |
| 5,701,412 A | * | 12/1997 | Takeda et al. ......... 379/221.09 |

\* cited by examiner

*Primary Examiner*—Bing Q. Bui
(74) *Attorney, Agent, or Firm*—Leonard C. Suchyta, Esq.; Joel Wall, Esq.; Straub & Pokotylo

(57) ABSTRACT

Methods and apparatus for implementing call forwarding services using AIN techniques and next event list messages are described. Methods of notifying a subscriber of a call forwarded using AIN techniques are also described. In accordance with one feature of the present invention, a subscriber is allowed to set the number of rings which are allowed to occur prior to a call being forwarded. The number of rings, e.g., the ring count, is stored as part of a customer's call processing record (CPR) which is used by a service control point (SCP) to implement the call forwarding service. The ring count information may be updated via the Internet or via a dial-up telephone connection. Call forwarding customers are provided with a distinctive ring, e.g., a ring shorter than an ordinary telephone ring, to notify them when a call is being forwarded. Distinctive rings may be used to distinguish between different forwarding services. For example a different ring may be used for forwarding to voice mail than for selective call forwarding or follow-me call forwarding. The distinctive ring may be implemented by using an SCP to instruct a telephone switch to provide any one of a plurality of different rings which are supported by the telephone switch or by simply causing the subscribers phone to ring for different periods of time which are shorter than a normal ring.

18 Claims, 17 Drawing Sheets

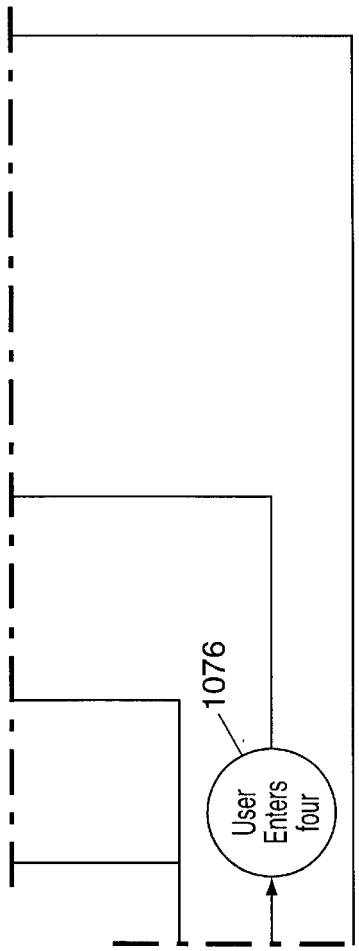
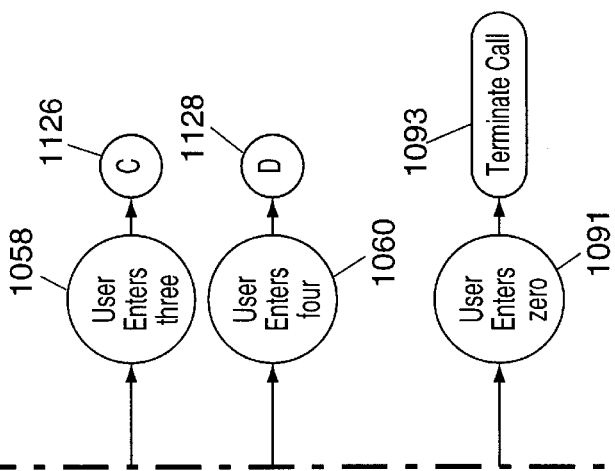
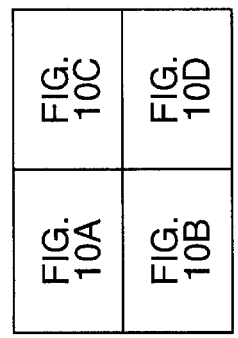
FIGURE 10D
FIG. 10

METHODS AND APPARATUS FOR NOTIFYING SUBSCRIBER'S OF FORWARDED CALLS

FIELD OF THE INVENTION

The present invention is directed to communications systems and, more particularly, to methods and apparatus for forwarding calls and providing optional notification of forwarded calls.

BACKGROUND OF THE INVENTION

Telephones, both mobile and land based, are a frequently used communications tool of modern society. While basic telephone service has remained generally unchanged in terms of its features for years, there is an ever increasing demand for new telephone services.

The demand for new telephone services, and telephone services which are easier to manage, is prompted by a desire to render telephones easier to use and/or to make them more efficient communication tools. The demand for new telephone services is also fueled by the desire of individual telephone companies to distinguish the services they offer from those of their competitors; create new revenue sources; and/or expand existing revenue sources.

Examples of telephone services which have been available for a relatively long period of time include telephone switch based call forwarding services. Switch based call forwarding services allow a user to forward calls directed to a first telephone number to a second telephone. Switch based call forwarding may be implemented for all calls directed to the first number or for only those calls which go unanswered for a predetermined period of time.

In known switch based call forwarding systems, the telephone switch includes the control logic which is used to determine when and to where a call is to be forwarded. In such systems, control of the telephone switch by a call forwarding service user, e.g., to enable/disable call forwarding, is normally achieved through the use of a touch tone phone and DTMF input or through a service order created by telephone company personnel.

In addition to a call forwarding service, customers may subscribe to voice mail, voice dialing, and a wide range of other telephone services. As the number of services to which a telephone user subscribes increases, the number of features which a subscriber and the telephone company needs to be able to control also increases. The limited nature of a telephone interface, e.g., speech and DTMF input, can make it difficult for an individual who subscribes to several telephone services to manage those services via the customary telephone/DTMF control interface.

In order to provide enhanced telephone services, many telephone companies now implement a telephone communications network as an Advanced Intelligent Network (AIN) which has made it easier to provide a wide array of previously unavailable voice grade telephone service features. In addition to new services, AIN may be used to implement services which appear to a user to be similar to known services which were implemented in the past solely using telephone switch logic located internal to the telephone switch.

In an AIN system, signal switching points (SSPs), detect one of a number of call processing events identified as AIN "triggers". SSPs may be implemented as central office telephone switches. An SSP which detects a trigger suspends processing of the call which activated the trigger, compiles a call data message and forwards that message via a common channel interoffice signaling (CCIS) link to a database system, such as a Service Control Point (SCP). The SCP may be implemented as part of an integrated service control point (ISCP). If needed, the SCP can instruct the central office (SSP) at which the AIN trigger was activated to obtain and forward additional information, e.g., information relating to the call. Once sufficient information about the call has reached the ISCP, the ISCP accesses stored call processing information or records (CPRS) to generate from the received message data, a call control message. The call control message is then used to instruct the central office on how to process the call which activated the AIN trigger. As part of the call control message, an ISCP can instruct the central office to send the call to an outside resource, such as an intelligent peripheral (IP) using a send to outside resource (STOR) instruction. IPs are frequently coupled to SSPs to provide message announcement capabilities, voice recognition capabilities and other functionality which is not normally provided by the central office. The control message is normally communicated from the ISCP to the SSP handling the call via the CCIS link. Once received, the SCP completes the call in accordance with the instructions received in the control message.

The current AIN standard is described in Bellcore document GR-1298-CORE, AINGR: Switching Systems, Issue 5, (November 1999). The current AIN standard supports, as part of the control functionality provided by the SCP, a next event list. The next event list includes a list of actions to be performed in a sequential order, e.g., in response to the occurrence of certain conditions such as busy and no answer conditions. Thus, a message from an SSP indicating that a call encountered a busy condition or was not answered in a predetermined amount of time may be used to trigger an SCP to proceed to the next entry in a next event list.

One service which can be implemented with AIN functionality is Wide Area Centrex. Centrex takes a group of normal telephone lines and provides call processing to add business features to the otherwise standard telephone lines. For example, Centrex adds intercom capabilities to the lines of a specified business group so that a business customer can dial other stations within the same group, e.g., lines belonging to the same company, using extension numbers such as a two, three, or four digit numbers, instead of the full telephone number associated with each called line. Other examples of Centrex service features include call transfer between users at different stations of a business group and a number of varieties of call forwarding. Thus, Centrex adds a bundle of business features on top of standard telephone line features without requiring special equipment, e.g., a private branch exchange (PBX) at the customer's premises. U.S. Pat. No. 5,247,571, which is hereby expressly incorporated by reference, describes in detail a Wide Area Centrex system implemented using AIN techniques.

In an attempt to make services provided using AIN techniques easier to manage, management of AIN services via a personal computer and the Internet have been suggested. U.S. Pat. No. 5,958,016, which is hereby expressly incorporated by reference, describes a system wherein a web page type interface is provided. The interface allows a subscriber access, via the Internet, to control and reporting functionalities of an AIN system.

Call forwarding services are one of the more commonly used telephone services. While basic call forwarding service is relatively easy to control, advanced call forwarding services, e.g., forward on busy, follow me, and other call forwarding services which involve conditional call forwarding or sequential call forwarding to multiple telephone numbers can be difficult to manage via a telephone. Accordingly, there is a need for methods and apparatus which make telephone call forwarding services easier to manage.

Another problem with call forwarding services is that users often forget to disable call forwarding when they return to the location from which they were having their calls forwarded. Accordingly there is also a need for notifying call forwarding subscribers when a call is being forwarded. When a subscriber can select from several call forwarding services to be used at any given time, e.g., general call forwarding, forward to voice mail, and selective call forwarding, it is also desirable that the subscriber be notified of the type of call forwarding being implemented in addition to being notified that a call is being forwarded.

SUMMARY OF THE INVENTION

The present invention is directed to methods and apparatus for providing call forwarding services and for providing optional notification of forwarded calls.

The call forwarding techniques of the present invention are implemented using AIN next event list functionality. In accordance with the present invention, call processing records, including a next event list, are generated and stored in an SCP for each call forwarding service subscriber.

By using an SCP and AIN next event list functionality to provide call forwarding services, subscriber control over such services is facilitated as compared to switch based call forwarding implementations. This is because user control over switch based functionality is somewhat limited in modern telephone systems. In accordance with the present invention, subscribers are allowed to update their call forwarding service information stored at, e.g., a service control point, by calling an interactive voice response system or via a computer and the Internet.

In accordance with the present invention, call forwarding service subscribers are provided the opportunity to be informed of forwarded calls through the use of a distinctive ring, e.g., a short ring sometimes called a Ping-Ring. The distinctive ring may be implemented by using AIN next event list functionality to connect an incoming call for a few seconds to the called line before being forwarded to the telephone number selected by the customer. This has the effect of causing the subscriber's line to ring briefly, e.g., less than a full ring, before being forwarded.

In another implementation, the SCP responsible for controlling forwarding of a call sends a message to the telephone switch to which the subscriber's phone is connected to cause the telephone to produce one of a plurality of distinctive rings. In addition, the SCP causes the call to be forwarded to a telephone number indicated by the subscriber.

The communications system of the present invention through the use of call processing records and the next event list of modern AIN systems, supports a wide range of call forwarding services. These services include call forwarding of all calls (CFOAC) with or without notification of a forwarded call, call forwarding on busy (CFOB), call forwarding on no answer (CFONA), selective call forwarding (SCF) with or without notification of a forwarded call, and follow me (FM) services.

A voice mail service can be implemented in accordance with the present invention by designating the telephone number of a voice mailbox as the number to which a call is to be forwarded, e.g., on a no answer condition.

When a subscriber subscribes to multiple call forwarding services, different distinctive rings may be used to notify the subscriber of a call forwarded by each of the various call forwarding services. For example, a subscriber may be notified of a call forwarded by a selective call forwarding service through the use of a first distinctive ring and notified of a call forwarded by the follow-me service through the use of a second distinctive ring. In addition, in the case of selective call forwarding, it is possible to use different notification rings to notify a subscriber of calls forwarded to different destination numbers. For example, a subscriber may be informed of calls forwarded to voice mail via a first short distinctive ring and of calls forwarded to his/her secretary via a second short distinctive ring which is readily distinguishable from the first short ring.

In accordance with one feature of the present invention, a subscriber is allowed to set the amount of time, e.g. expressed in terms of a number of rings, which are allowed to occur before a call is forwarded in accordance with a forward on no answer call forwarding service or follow-me service of the present invention. The time information may be stored at the SCP as part of the customer's CPR.

In accordance with another feature of the present invention, customers are provided an easy way to enable/disable call forwarding service from the subscriber's phone, i.e., the phone for which call forwarding service is provided. In accordance with this feature, a subscriber can call an intelligent peripheral device used to control call forwarding service from his/her phone. The subscriber's phone number is identified using automatic number identification (ANI) techniques and the subscriber's CPR is accessed. If call forwarding is enabled on the subscriber's phone, the subscriber can disable call forwarding by simply pressing a first code, e.g. *73. This causes the subscriber's CPR, and/or TAT trigger set on the subscriber's line, to be modified so that call forwarding will be disabled.

If call forwarding is disabled on the subscriber's phone, but was previously used, the subscriber can enable call forwarding to the last number to which calls were forwarded by simply pressing *72. This causes the subscriber's CPR, and/or TAT trigger on the subscriber's line, to be modified so that call forwarding will be enabled. This feature is made possible by the fact that the CPR, unlike a telephone switch, stores the previously used call forwarding number even after call forwarding is deactivated.

Various additional features and advantages of the present invention will be apparent from the detailed description which follows.

DETAILED DESCRIPTION

As discussed above, the present invention is directed to methods and apparatus for forwarding calls and providing optional notification of a forwarded call. The call forwarding and notification services of the present invention may be provided as a stand-alone service, as part of a Centrex service, or as part of another telephone service package. As will be discussed in detail below, in accordance with one feature of the present invention, individuals can modify their call forwarding status and information via the Internet and/or through use of their telephones.

Figure 1:
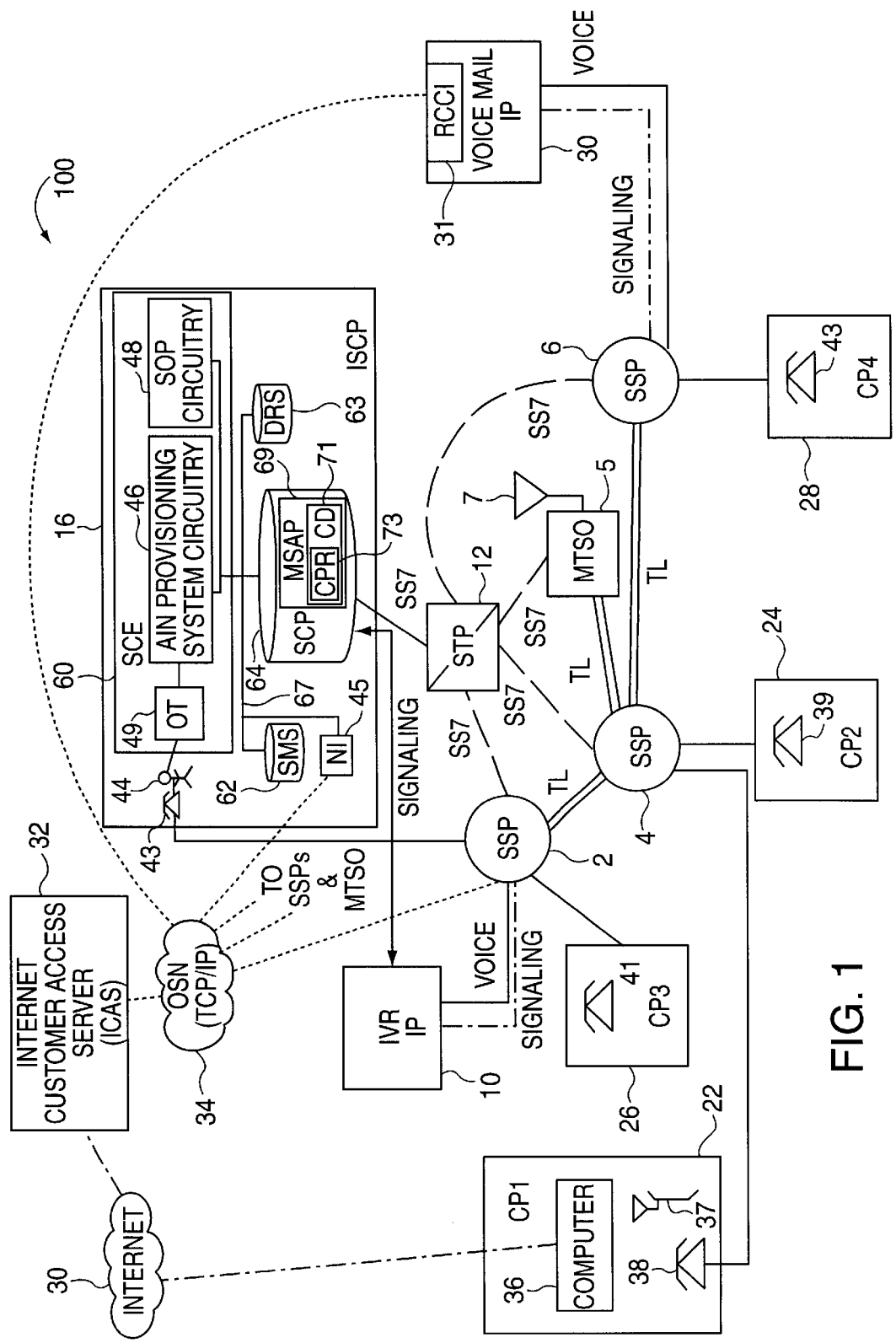
FIG. 1 illustrates a communication system implemented in accordance with an exemplary embodiment of the present invention.

FIG. 1 illustrates a communication system 100 implemented in accordance with an exemplary embodiment of the present invention. The system 100 supports communications via the Internet 30, as well as the public telephone switching network (PTSN). The PTSN includes a plurality of signal switching points (SSPS) 2, 4, 6 which, as is known in the art, may be implemented using known Class V telecommunications switches, e.g., telephone switches, capable of supporting the signaling system seven (SS7) protocol. Each SSP 2, 4, 6 may correspond to a different telephone central office. Trunk lines (TLs), which may comprise, e.g., one or more T1 lines, interconnect the various SSPs 2, 4, 6. In addition to SSPs 2, 4, 6, the system 100 includes a mobile telephone switching office (MTSO) 5 for servicing mobile telephone calls. The calls may be received via antenna 7. The MTSO 5 is coupled to one or more SSPs, e.g., SSP 4 via trunk lines. In this manner, cellular telephone calls can be routed and processed via an SSP 4 allowing interaction with land line telephones as is known in the art.

Each SSP 2, 4, 6 is normally connected to one or more customer premises (CP) which may include, e.g., residences and/or offices. In the FIG. 1 example, first and second customer premises 22 and 24 are coupled to the second SSP 4, third customer premises 26 is coupled to the first SSP 2 while the fourth customer premises 28 is coupled to SSP 6. Connections between the SSPs and CPs may be by POTS lines, ISDN lines, DSL, or other known communications lines.

Communications equipment, referred to as customer premise equipment (CPE) is located at each customer premises 22, 24, 26, 28. Customer premise equipment.may include, e.g., telephones, faxes, computers, etc. In FIG. 1, a computer 36, land-line telephone 38, and mobile telephone 37 are shown as being located at the first customer premises 22. Since cell phone 37 is a mobile communications device it need not be physically located at the first customer premises to operate. The computer 36, located at the first customer premises 22 is coupled by any one of a plurality of known connection techniques, e.g., telephone dial-up, ISDN, DSL, etc., to the Internet 30, also known as the World Wide Web.

While the second, third and fourth customer premises 26, 28 are illustrated as including only landline phones, it is to be understood that they may have any number of communications devices including, e.g., telephones, faxes, and computer devices. Additional telephone service subscribers may be coupled to any one of the SSPs 2, 4, 6.

The system 100 is implemented using AIN techniques. Accordingly, the processing of calls directed to a customer's telephone line and received by an SSP from a telephone customer's line may be controlled by instructions included in customer call processing records (CPRs). In the system 100, the CPRs are stored at an Integrated Services Control Point (ISCP) 16. The CPRs may include sequential contingent call processing instructions in the form of a next event list. At least one CPR exists for each subscriber to an AIN based service. A customer's CPR is accessed in response to activation of an AIN trigger set at, e.g., the SSP 2, 4, or 6 to which the subscriber's line or lines are connected, e.g., by POTS lines.

The ISCP 16 includes an SCP 64, a service management system (SMS) 62, data and reporting system (DRS) 63, service creation environment (SCE) 60, and a network interface (NI) 45. A local network 67 couples the various components of the ISCP 16 together.

The network interface 45 couples the ISCP 16 to various other components of the telephone network 100 via a TCP/IP based network referred to as an operational services network (OSN) 34. The OSN 34 interconnects SSPs 2, 3, 6, the MTSO 5, Intelligent Peripherals (IPs) 18, 10, 20, and the ISCP 16. Thus, the OSN 34 is a network over which control and signaling information can be passed between the various system components, e.g., using TCP/IP. In addition to being connected to the OSN 34, ISCP 16 is connected, via its SCP 64, to the SSPs and MTSO via one or more signal transfer points (STPs) 12 and Signaling System Seven (SS7) interconnects over which messages, data, and requests for call processing control instructions can be communicated between the SSPs 2, 4, 6, or MTSO 5 and ISCP 16 in accordance with the SS7 protocol.

The SCP 64 includes a multi-service application platform (MSAP) database 69, which includes customer data (CD) 71 for each of a plurality of call forwarding and/or other service subscribers. The customer data 71 includes, for each customer: 1) a list of the services to which the customer subscribes; 2) a password which may be input via DTMF signals; and 3) a call processing record (CPR) 73 which is used to instruct an SSP how to process a call in response to one or more AIN triggers to thereby implement the services to which the customer subscribes. The subscriber's CPR also includes information such as the telephone number calls are to be forwarded to, whether call forwarding notification is to be provided. Exemplary services which may be supported by the ISCP 16 include, e.g., call forwarding, call screening, voice mail and a host of other services which may be provided to non-Centrex as well as Centrex telephone customers.

The customer data 71 which includes one or more call processing records 73 is generated, at least initially, by the SCE 60 in response to input received from a service representative or operator 44. Customer data in the database 71 and the CPR 73 may, after initial provisioning of a service for a customer, be updated by the customer via telephone or the Internet with the use of a Web browser.

The SCE 60 includes an operator terminal (OT) 49, service order processing circuitry 48 and AIN provisioning system circuitry 46. The operator terminal 49 is used by the service representative 44 to enter service information, e.g., to create a service account for a new subscriber. The entered data may be information, e.g., relating to the addition of a new customer, the adding of a service for an existing customer, and/or the cancellation of a service being provided to an existing customer. The service order processing circuitry 48 is used to generate service orders, e.g., orders to add or cancel a service, in response to service information entered into the operator terminal 49. The AIN provisioning system circuitry 46 is responsible for setting and/or updating AIN triggers at the various signal switching points (SSPs and MTSO) required to implement a service order generated by the service order processing circuitry 48. In addition to setting AIN triggers, the AIN provisioning system circuitry 46 is responsible for generating and/or updating customer data, e.g., call processing records 73, and other information stored in various locations in the system 100, as required to implement a service order. As will be discussed below, various IPs 10, 30 are used to provide services to telephone service subscribers. Thus, in addition to updating information in the customer database 71, the AIN provisioning system circuitry is responsible for updating information in the various IPs 10, 30 as required. The updating of the IPs and the setting of AIN triggers can be performed by the AIN provisioning system circuitry 46 through communications with the various system components conducted using the OSN 34 and/or via SS7 links.

Once service to a customer has been initially configured by a service representative 44, a service subscriber, e.g., a call forwarding service subscriber can, in accordance with the present invention, update various service information though the use of a personal computer and a Web Browser application. Known browsers which can be used for this purpose include Internet Explorer and Netscape.

In the FIG. 1 system, the service subscriber to whom the first customer premises corresponds can update the subscriber's service information, e.g., call forwarding information, via the use of computer 36 and an Internet connection.

The system 100 includes an Internet Customer Access Server (ICAS) 32. The server 32 serves as a secure gateway via which telephone service subscribers can update and configure their telephone service information using a computer coupled to the Internet. The ICAS 32 includes security routines, e.g., a firewall, designed to prevent individuals other than the subscriber gaining access to and/or modifying via the Internet, subscriber service information. The ICAS 32 is coupled to the OSN 34 thereby allowing a customer, upon satisfying various security checks, to access and modify service information stored in any one of the various network devices, e.g. ISCP 16, and/or IP 30, coupled to the OSN 34.

In order to implement various services, such as voice mail and to provide customers the opportunity to access and update telephone service information, intelligent peripheral (IP) devices such as IPs 30 and 10 are used. The first IP 10 is an interactive voice response (IVR) IP which is capable of performing speech recognition and/or DTMF signal detection operations as well as playing voice prompts and other messages to a telephone service subscriber.

IVR IP 10 is coupled to the first SSP 2 via audio (voice) lines. It is also coupled to the OSN through a network interface (NI) 21. The IVR IP 10 may be implemented using known hardware.

The IVR IP 10 serves as a platform by which a telephone service subscriber can update his/her service information, e.g., call forwarding and voice mail information, through a telephone as opposed to an Internet connection. A telephone service subscriber can establish a service updating or management session with the IVR IP 10, by dialing a telephone number associated with the IVR IP 10. Dialing of the IVR IP's telephone number results in the subscriber's call being routed to SSP 2 and a voice/DTMF connection to the DTMF IP being established.

DTMF IP 10 includes various security features, e.g., customer identification and password entry requirements, as does the ICAS 32, to insure that telephone customers are limited to accessing and updating their own service records and not those of other telephone service subscribers. As an additional security measure, upon initial activation, customers may be required to call from their subscribed to telephone. In such an embodiment, the DTMF IP 10 will read the ANI (Automatic Number Identification) of the calling number and will verify with the ISCP 64 that the caller is an authorized new user. The DTMF IP 10 then requires the customer to enter a new PIN (Personal Identification Number).

The second IP 30 is a voice mail IP which provides voice mail service to voice mail telephone service subscribers. A subscriber can access his/her mailbox by calling a telephone number associated with the voice mail IP. When connected to the voice mail IP, a voice mail service subscriber can enable/disable voice mail. In addition, in accordance with the present invention, a voice mail service subscriber can modify the number of rings which are allowed to occur prior to a call directed to a subscriber's line being redirected to the subscriber's voice mail.

As will be discussed below, the user's ability to set the number of rings which are allowed to occur prior to redirection of a call applies to call forwarding on no-answer services and is not limited to the case of voice mail service.

In accordance with the present invention, call forwarding is implemented through the use of AIN techniques and a TAT trigger set on the subscriber's line when voice mail is enabled. The number of rings, which are allowed to occur prior to the call being forwarded to voice mail, referred to as a ring count, is stored in the customer's CPR in the SCP 69. The voice mail IP 30 includes a ring count change interface (RCCI) 31, which is coupled to the OSN 34. When connected to the voice mail IP, the voice mail subscriber is allowed to set the number of rings, which are to occur prior to a call being forwarded to voice mail. The ring count set by the subscriber, is transmitted by the RCCI 31 via the OSN 34 to the SCP 64 where the updated ring count is stored in the subscriber's CPR 73.

Figure 2:
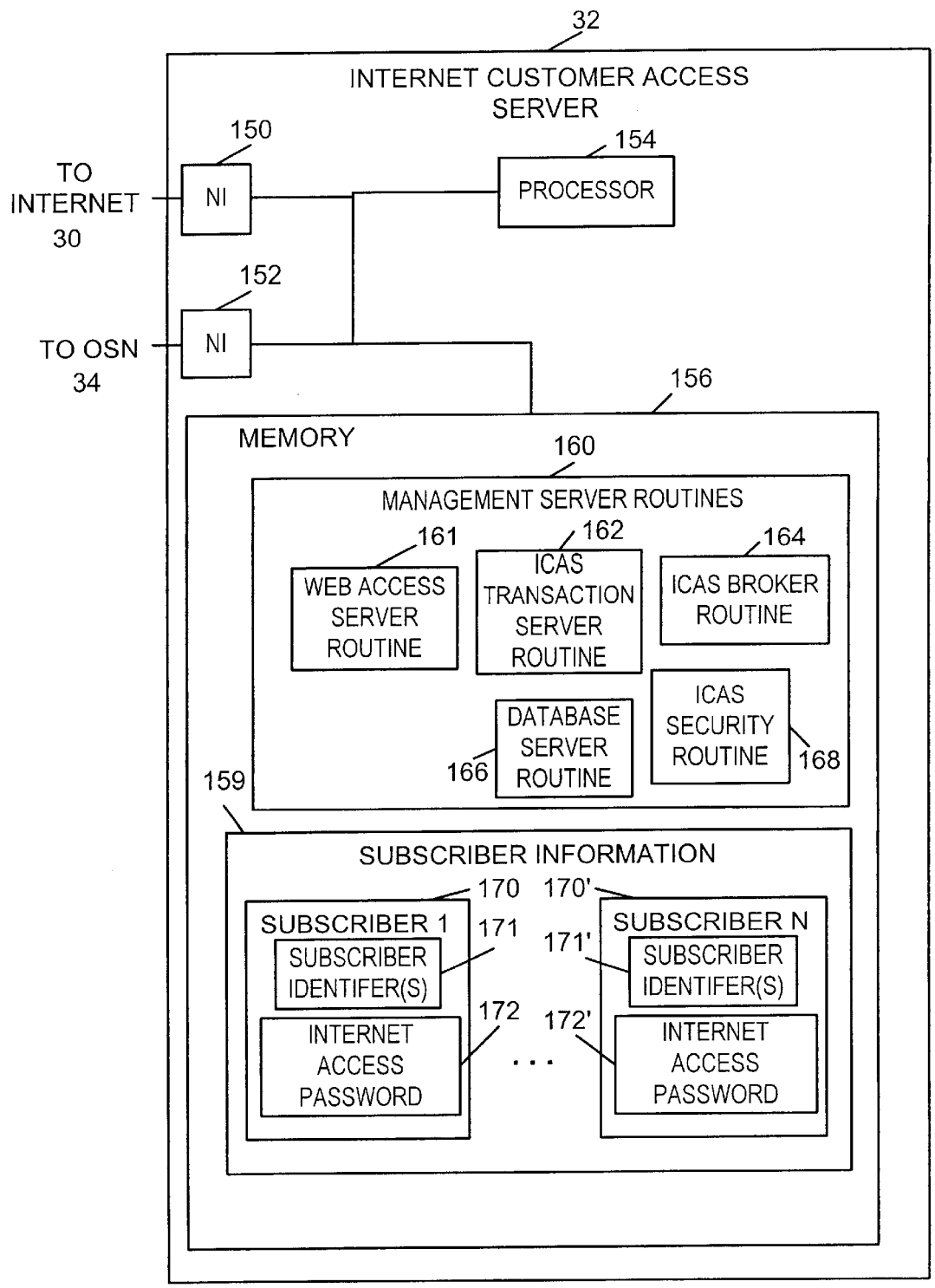
FIG. 2 illustrates an exemplary internet customer access server which may be used in the system illustrated in FIG. 1

The ICAS 32 will now be discussed briefly with regard to FIG. 2. As illustrated, the ICAS 32 comprises first and second network interfaces 150, 152, a processor 154 and memory 156 which are coupled together as shown in FIG. 2. The first network interface 150 links the ICAS 32 to the Internet 30 while the second network interface 152 links the ICAS 32 to the OSN 34. Thus, the ICAS 32 serves as a gateway by which a service subscriber can gain access from the Internet, after being authenticated, to the various telephone system network components, e.g., the ISCP 16. Through use of the ICAS 32 telephone service subscribers can manage the telephone services to which they subscribe via their personal computers and a Web Browser application.

The processor 154 is responsible for executing various applications and/or routines stored in memory to provide firewall and various service management features to Centrex subscribers. The routines executed by the processor 154 are stored in memory 156 until being needed by the processor 154, e.g. to service a telephone service subscriber. Memory 156 includes telephone service subscriber information 159. The telephone service subscriber information includes, for each subscriber 170, 170', one or more subscriber identifiers 171, 171', the subscriber's Internet access password 172, 172', and information identifying the voice mail IP, e.g., IP 30, assigned to store the particular subscriber's voice mail messages.

In addition to the telephone subscriber information 159, memory 156 includes a set of management server routines 160.

The management server routines 160 include a Web access server routine 161, an ICAS transaction server routine 162, a database server routine 166, an ICAS broker routine 164, and an ICAS security routine 168. The routines which form the management server application 160 are responsible for providing a subscriber access to telephone service subscriber information and hardware required to manage the subscriber's services.

The Web access server routine 161 is responsible for initially interfacing with the telephone service subscriber and for providing web pages to be displayed. The server routine 161 interfaces with the other routines, which are responsible for performing security checks, retrieving subscriber data, and performing other functions.

The transaction server routine 162 is responsible for determining what other routines need to be accessed to provide the user with a requested service or transaction.

The database server routine 166 is responsible for controlling access to, and retrieval of, locally stored information, e.g., telephone service information included in the subscriber information database 159. The database server routine 166 interacts with the other routines 162, 164, 168 to provide telephone service subscriber information as required.

The ICAS broker routine 164 is responsible for determining the availability of system components, e.g., system resources, to meet the needs of the various other routines including the transaction server routine 162 and to retrieve data as needed from other components of the system 100. Accordingly, when attempting to establish a connection with an IP or another network device such as the ISCP 16, e.g., to obtain information, the transaction server routine 162 uses the ICAS broker routine 164 to determine resource availability and to arrange the desired connection used to perform the data retrieval operation.

The ICAS security routine 168 is responsible for providing security, e.g., firewall protection. The ICAS security routine 168 is invoked when a subscriber attempts to login to manage his/her telephone services and when a subscriber invokes management functions such as the password modification function for which added security measures are employed. In some embodiments security routine 168 prompts the user for additional information beyond the subscriber's Internet password and then checks the information provided by the subscriber, to add an additional level of security to certain operations such as password modification.

Figure 3:
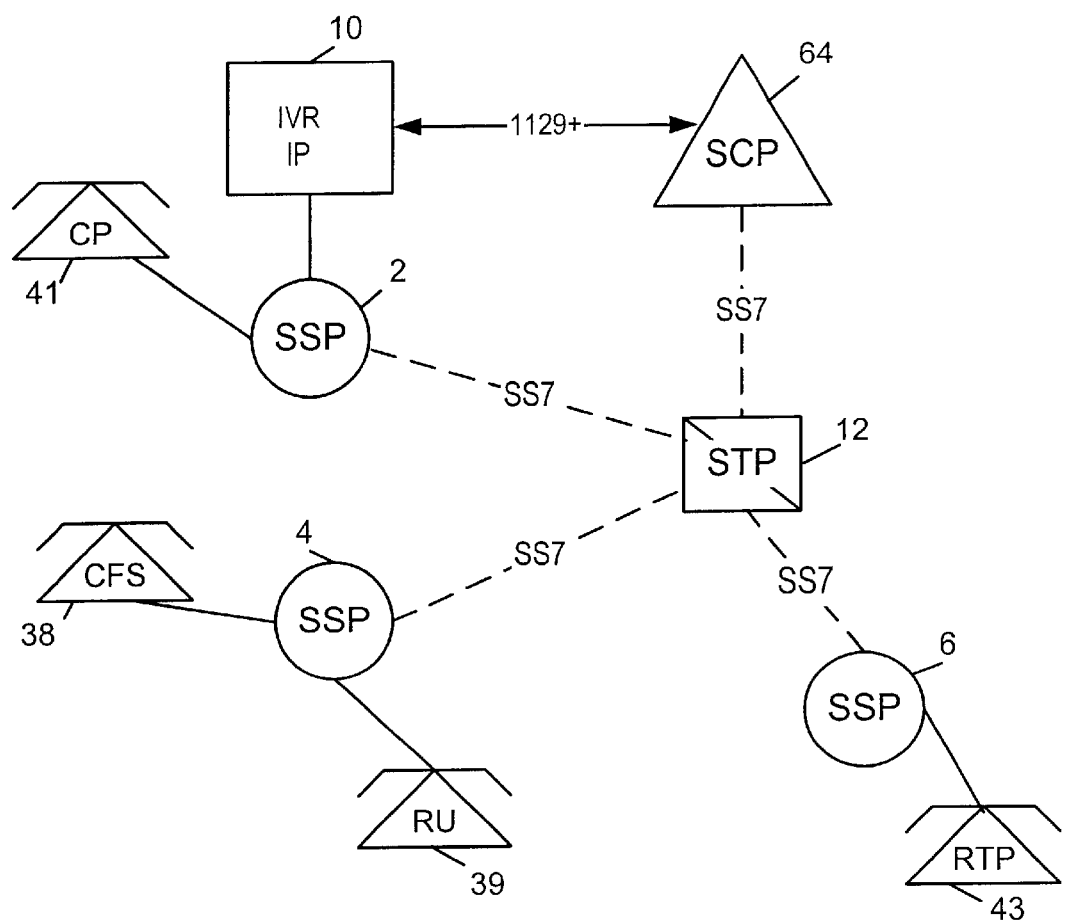
FIG. 3 is a simplified illustration of a communication system implemented in accordance with the present invention.

FIG. 3 is a simplified diagram of the communication system 100 which will be used to explain various features of the present invention. In the FIG. 3 example, it is assumed that the telephone 41 is used to place a call. For purposes of explanation telephone 41 will be referred to as a calling party (CP) telephone. In FIG. 3, it is also assumed that telephone 38 corresponds to a call forwarding service (CFS) subscriber. Accordingly, telephone 38 will be referred to as a CFS telephone. For purposes of explanation, it will also be assumed that calls are forwarded to the telephone number corresponding to telephone 43. Accordingly telephone 43 will be referred to as the redirected to phone (RTP). Calls may be forwarded to a voice mailbox, as opposed to a telephone, in which case a voice mailbox would take the place of the telephone 43.

In FIG. 3, the CP telephone 41 is coupled to the first SSP 2. The CFS phone 38 and an additional phone 39 is coupled to the second SSP 4, while the RTP phone 43 is coupled to SSP 6. Also coupled to SSP 2 is IVR IP 10. Thus, a telephone service subscriber can contact IVR IP 10 from any phone coupled to the telephone network via call routing through SSP 2. In addition to being coupled to SSP 2, IVR IP 10 is coupled to SCP 64 via a signaling line over which information can be communicated in accordance with the 1129+ protocol. A signal transfer point STP 12 and signaling system seven (SS7) communications lines couple the various SSPs and SCP 64 together.

In accordance with the present invention communications system of FIG. 3, through the use of call processing records and AIN next event list functionality can support a wide range of call forwarding services. These services include call forwarding of all calls (CFOAC) with or without notification of a forwarded call, call forwarding on no (or don't) answer (CFONA), call forwarding on busy (CFOB), selective call forwarding (SCF), and follow me (FM) services.

CFOAC service involves the forwarding of all calls directed to a telephone number for which CFOAC service has been activated. In accordance with the present invention call forwarding is achieved using AIN techniques. In one embodiment, this involves setting a terminating attempt trigger on the subscriber line when call forwarding is activated and then using the SCP to redirect calls to a call forwarding telephone number stored in a subscriber's CPR, e.g., a forwarding telephone number designated for use with CFOAC service. In accordance with the present invention, a subscriber will be notified of the forwarding of a call via a distinctive ring on the subscriber's phone. The ring may be a short ring, sometimes referred to as a ping-ring. The subscriber can enable or disable the call forwarding notification feature as will be discussed further below.

CFONA service involves the forwarding of calls directed to a telephone number which go unanswered. In accordance with one feature of the present invention, a subscriber can specify the amount of time the phone is allowed to ring prior to the call being forwarded. The amount of time may be specified as a number of rings called a ring count, e.g., 2–7 rings. CFONA service may be used to implement a voice mail system. This can be done by specifying the telephone number of a voice mail box or answering machine as the destination telephone number calls are to be forwarded to when they go unanswered. As will be discussed in detail below, CFONA service is implemented in accordance with the present invention by using AIN next event list functionality to set a timer on a subscriber's line which detects how long the phone is allowed to ring. If the timer times out before the call is answered, the SCP 64 is contacted and the SCP 64 causes the call to be forwarded to a telephone number previously specified by the subscriber.

CFOB service involves forwarding of calls which encounter a busy condition on the subscriber's line. As with the CFOAC service, calls are forwarded under direction of the SCP to a telephone number included in the subscriber's CPR for use with CFOB service. In accordance with the present invention, if the line to which the call is forwarded is busy or goes unanswered the call can be redirected to a secondary forwarding number provided by the subscriber using AIN next event list functionality.

SCF service involves the forwarding of some but not necessarily all calls. SCF service allows a subscriber to specify the telephone number of calling parties whose calls are to be forwarded. For example, an attorney may allow calls from a selected few clients to be forwarded to his home while allowing everyone else's calls to remain unforwarded at his/her office. Alternatively, SCF service allows a subscriber to specify that all calls but those on a selected list be forwarded, e.g., to a telephone number corresponding to a voice mail box. In such a case, the subscriber may wish to allow important clients to disturb him/her with all other callers being directed to voice mail. In accordance with the present invention, AIN functionality is used to determine, based on the calling party's telephone number, which calls are to be forwarded and which are not to be forwarded. In accordance with the optional call forwarding notification feature of the present invention, a subscriber may be notified of forwarded calls when the subscriber has this feature activated.

FM service is a service which allows a customer's calls to be forward to one or more telephone numbers in sequence, assuming the call is not answered in a preselected amount of time to a number to which it is directed. In the FM service of the present invention, a subscriber provides a list of telephone numbers to be contacted in sequence in the event that a call to the subscriber's phone goes unanswered. The FM list of phone numbers is stored as part of the subscriber's CPR. Using AIN next event list functionality a call initially directed to a subscriber's line is redirected, sequentially, to the telephone numbers on the FM list. Thus, a call is redirected to the next number on the FM list when the call goes unanswered for a preselected amount of time.

In accordance with the present invention, a voice mail service can be provided by designating the telephone number associated with a voice mailbox as the number to which calls are to be directed. In the case of CFONA service directed to a voice mailbox, a subscriber can modify the time the phone will be allowed to ring before the call is transferred to voice mail. This can be done by adjusting the call forwarding ring count stored in the subscriber's CPR.

As discussed above, the AIN based call forwarding techniques of the present invention allow for optional notification of forwarded calls by way of a distinctive ring, e.g., a shorter than normal ring sometimes referred to as a ping ring.

Figure 14:
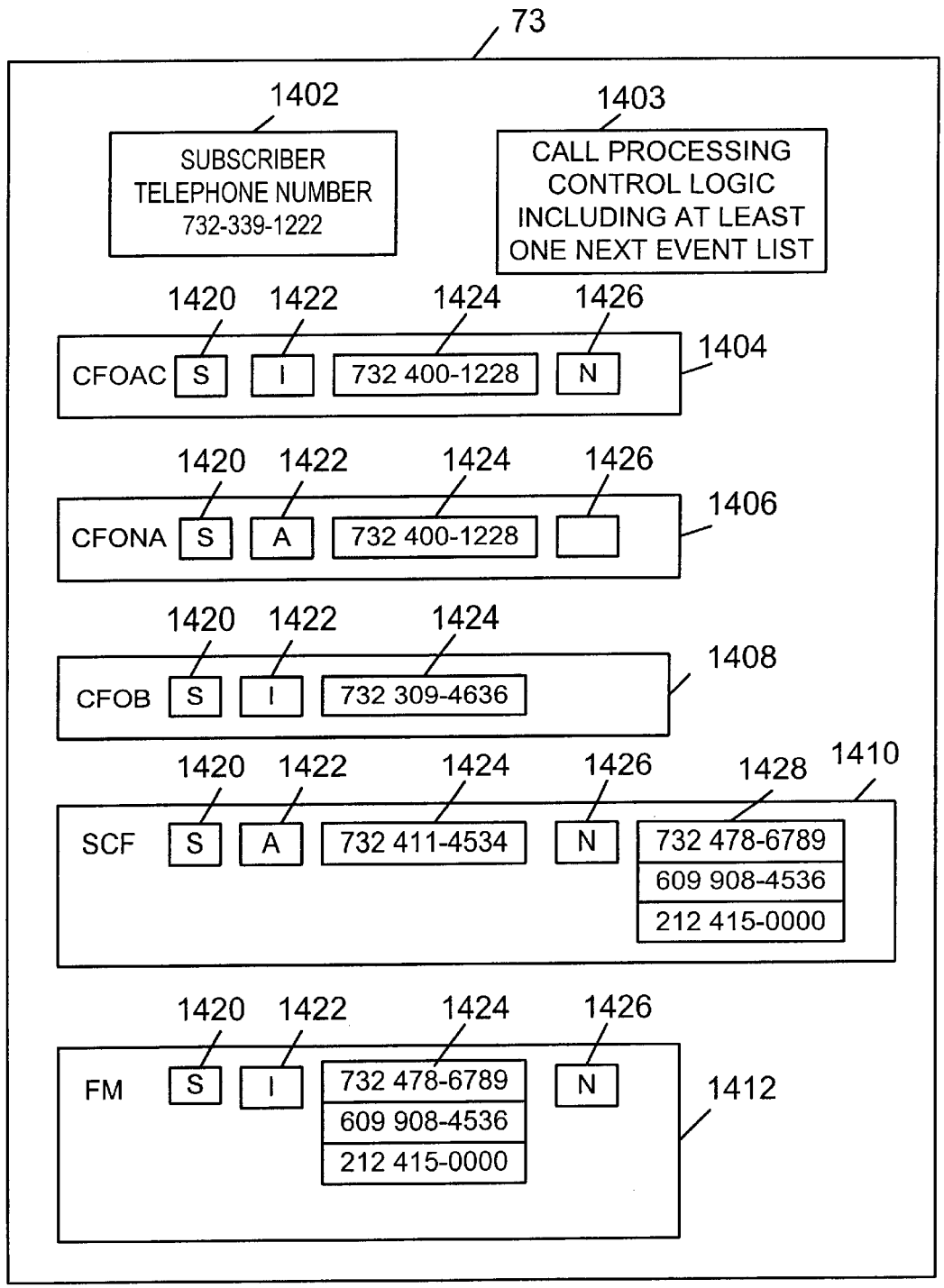
FIG. 14 illustrates an exemplary CPR and various information which may be stored in a CPR in accordance with the present invention.

AIN based call forwarding services are implemented, using information, e.g., service information and processing control logic steps, stored in a subscriber's CPR 73. FIG. 14 illustrates an exemplary CPR 73 of a subscriber who subscribes to each of the above mentioned call forwarding services. The CPR includes subscriber telephone number information 1402 used to access and identify the CPR, call processing control logic including at least one next event list 1403 used by an SCP to determine what call processing should occur in response to an AIN trigger event, and information identifying the services to which the caller subscribes and information e.g., forward to, telephone numbers to be used in providing various services. In the FIG. 14 embodiment, the CPR 73 includes CFOAC service information 1404, CFONA service information 1406, CFOB service information 1410, and FM service information 1412.

Each set of service information includes an indicator 1420 which indicates whether or not the subscriber subscribes to the particular service which is offered. An S in box 1420 is used to indicate, in the FIG. 14 example, that CPR 73 corresponds to a subscriber which subscribes to all of the call forwarding services. A blank in one of the boxes 1420 would indicate that the subscriber does not subscribe to that particular call forwarding service.

Each set of service information further includes an active/inactive (A/I) indicator 1422 which indicates whether the subscriber has the service activated or not. In the FIG. 14 example, CFONA service and SCF service is active with the rest of the call forwarding services being set to inactive.

Each set of call forwarding service information also includes one or more telephone numbers 1424 to which a telephone call is to be redirected to by the particular service. Note that different redirected to service numbers may be provided for different call forwarding services and that for FM service a list of telephone numbers is normally provided.

For services such as CFOAC service, CFONA service, SCF service and FM service, for which optional call forwarding notification is supported, each set of service information also includes notification control information 1426. An N in service information sets 1404, 1406, 1410 and 1412 indicates that call forwarding notification is enabled for CFOAC service, SCF and FM service. Call forwarding notification is not set for CFONA service in the FIG. 14 example and in some cases is not supported for CFONA service.

In the case of SCF service a list 1428 of telephone numbers to be forwarded or blocked is normally also stored as part of the CPR.

The information stored in a subscriber's CPR 73 is accessed and used by the SCP 64 in conjunction with the control logic 1403 to implement the various AIN services of the present invention.

The call forwarding methods of the present invention and call forwarding notification techniques will now be described with reference to the call flow diagrams of FIGS. 4–9. These diagrams illustrate process steps and the transfer of messages, data, and other signals between components of the system 100, which occur as part of various call forwarding services. The top row in each of FIGS. 4–9 illustrate system components which may be used when routing a call. In FIGS. 4–9 boxes in rows, other than the top row, represent steps while arrows are used in FIGS. 4–9 to represent the transfer of signals, data, and/or messages between system components.

Figure 4:
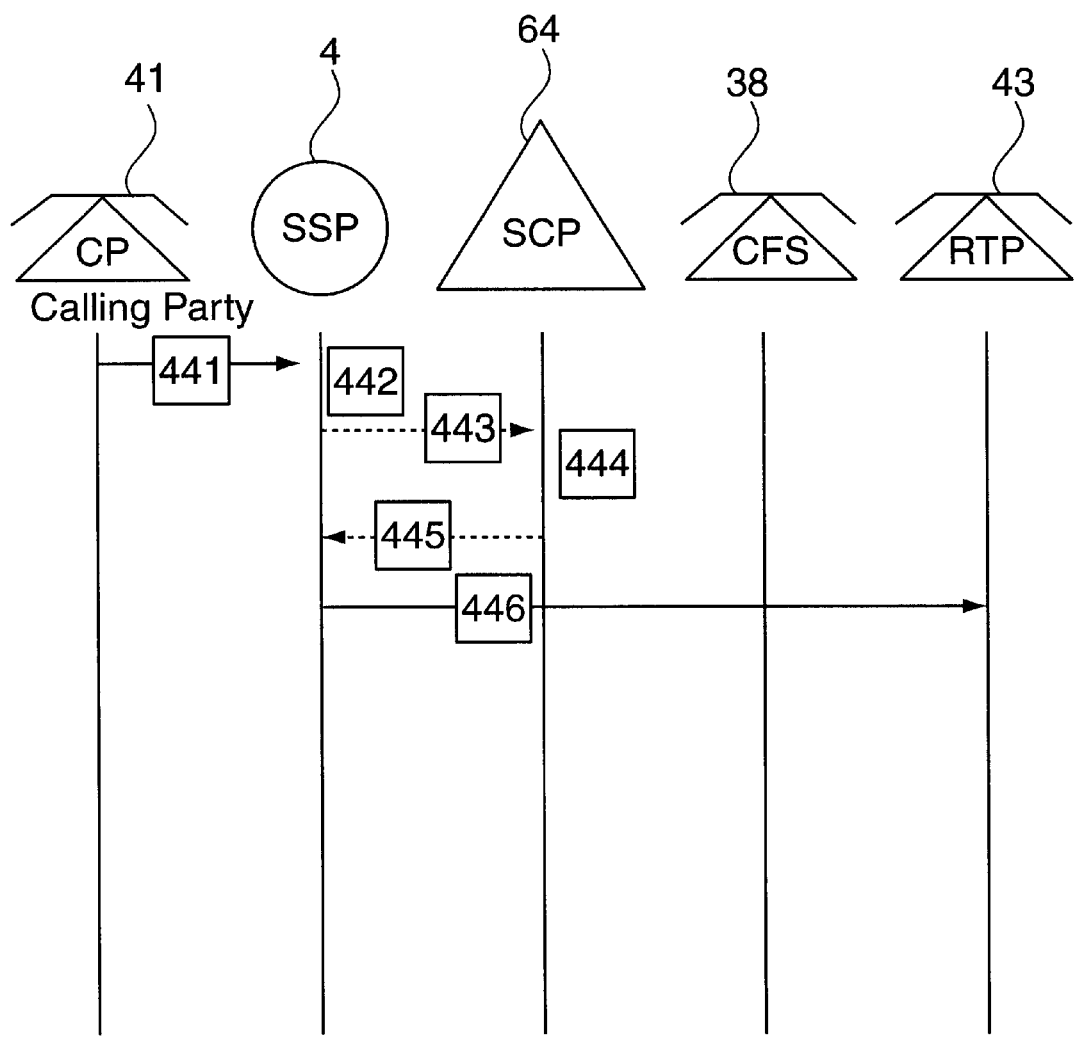
FIGS. 4–9 are call flow diagrams which illustrate the steps, in addition to the passage of data, instruction and messages, associated with the forwarding of calls in accordance with the present invention.

FIG. 4 illustrates the call flow associated with forwarding of all calls (CFOAC) service, applied to a subscriber's phone 41 without notification of a forwarded call being provided. The process begins in step 401 with a call originating from the calling party (CP) phone 41, initiated by dialing the subscriber's telephone number. The call initiated in step 401 is routed to the subscriber's terminating telephone switch 4. In step 402, call processing is halted in response to activation to a TAT trigger set on the subscriber's line at the subscriber's terminating switch 4. With call processing paused, in step 403, a query for call processing instructions is generated and transmitted to the SCP 64. The query includes calling party and called party ID information, e.g., the telephone number of the calling party 41 and the telephone number of the called party, respectively.

In response to the query, the SCP 64 opens, using the called party ID as a keyword to identify a CPR, the subscriber's CPR. From the CPR the SCP determines in step 404 that the user has activated forwarding of all calls without notification. Based on this information in step 405, the SCP 64 generates and transmits, a Forward Call Response message to the SSP 4 with a forward to telephone number obtained from the subscriber's CPR. In response to the message, the SSP 4, in step 406, forwards the call to the telephone corresponding to the telephone number obtained from the SCP 64.

Figure 5:
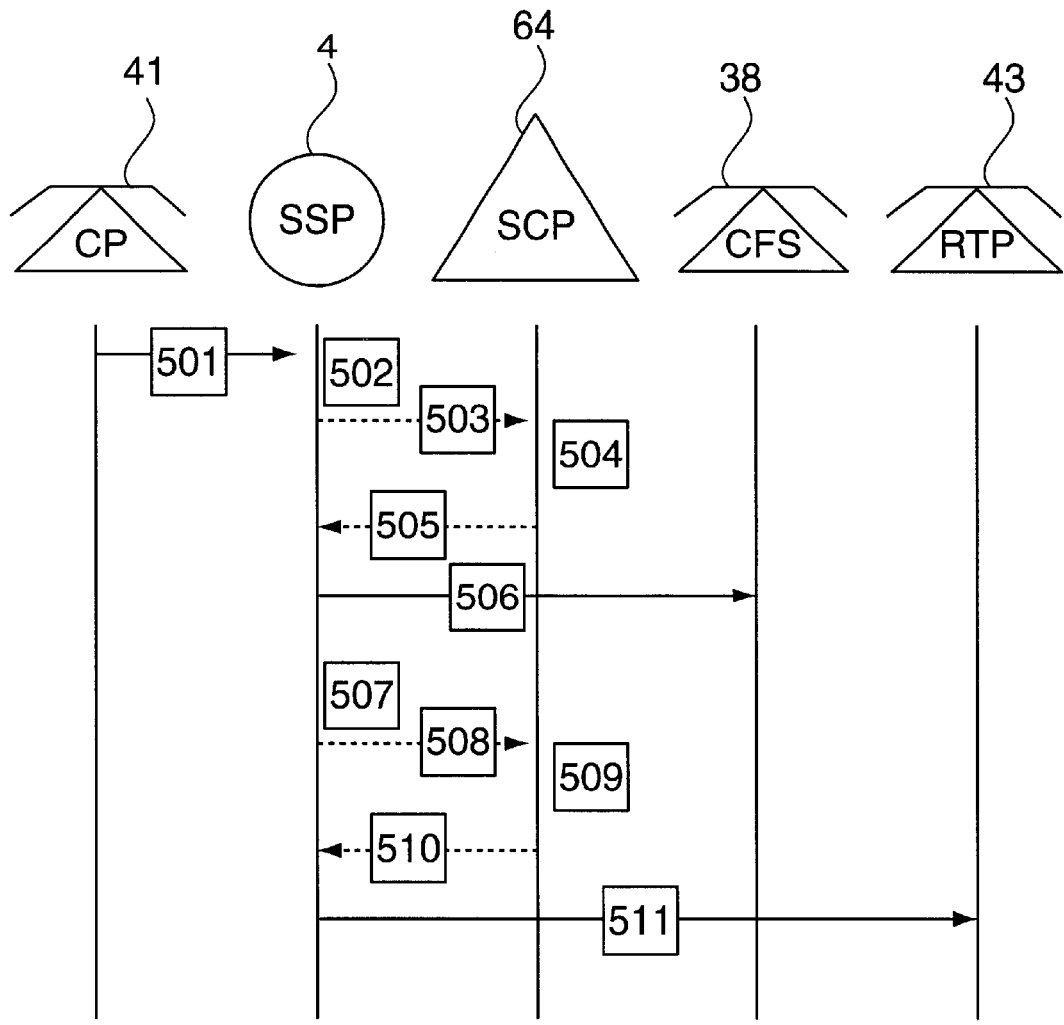

FIG. 5 illustrates the call flow associated with the forwarding of all calls (CFOAC) to a subscriber's phone 41 with notification of a forwarded call being provided. Call forwarding notification is provided in the form of a short ring, e.g., a 3–4 second ring on the subscriber's phone. Such a ring is sometimes called a ping ring.

The call forwarding process illustrated in FIG. 5 begins in step 501 with a call originating from the calling party (CP) phone 41 being initiated by a caller dialing the subscriber's telephone number. The call initiated in step 501 is routed to the subscriber's terminating telephone switch 4. In step 502, call processing is halted in response to activation to a TAT trigger set on the subscriber's line at the subscriber's terminating switch 4. With call processing paused, in step 503, a query for call processing instructions is generated and transmitted to the SCP 64. The query includes calling party and called party ID information, e.g., the telephone number of the calling party 41 and the telephone number of the called party, respectively.

In response to the query, the SCP 64 opens, using the called party ID as a keyword to identify a CPR, the subscriber's CPR. From the CPR the SCP 64 determines in step 504 that the user has activated forwarding of all calls with notification. Based on this information, the SCP 64 generates and transmits, in step 505, a Termination Response message with a TNoAnswer NEL to the SSP 4. In an exemplary embodiment, the time on the NEL is set to three seconds to produce a shorter than normal ring (ping ring). In step 506 the SSP 64 rings the called party 38 in response to the Termination Response message and sets the timer which keeps track of the duration of the ring. Assuming the call goes unanswered for 3 seconds, in step 507, the 3 second NEL will time out at the SSP 4 causing the SSP 4 to seek additional call processing instructions from the SCP 64. To obtain additional call processing instructions, in step 508 the SSP 4 transmits a TNoAnswer NEL to the SCP 64. In step 509, the SCP 64 responds to the TnoAnswer NEL by accessing control logic including a next event list in the subscriber's CPR to determine the action to take next. Based on the information in the subscriber's CPR, the SCP 64 generates a signal to instruct the SSP 4 to halt the ringing and also generates a Forward Call Response Message with a preprogrammed forward to telephone number obtained from the subscriber's CPR. The signal to halt the ringing and the Forward Call Response message is transmitted in step 510 to the SSP 4. The SSP 4 stops the ringing. Then, in response to the Forward Call Response message, the SSP 4 forwards the call to the telephone number which was previously programmed by the subscriber via either the IVR IP 10 or an Internet connection. The routing of the call to the phone 43 indicated by the programmed telephone number occurs in step 511.

Figure 6:
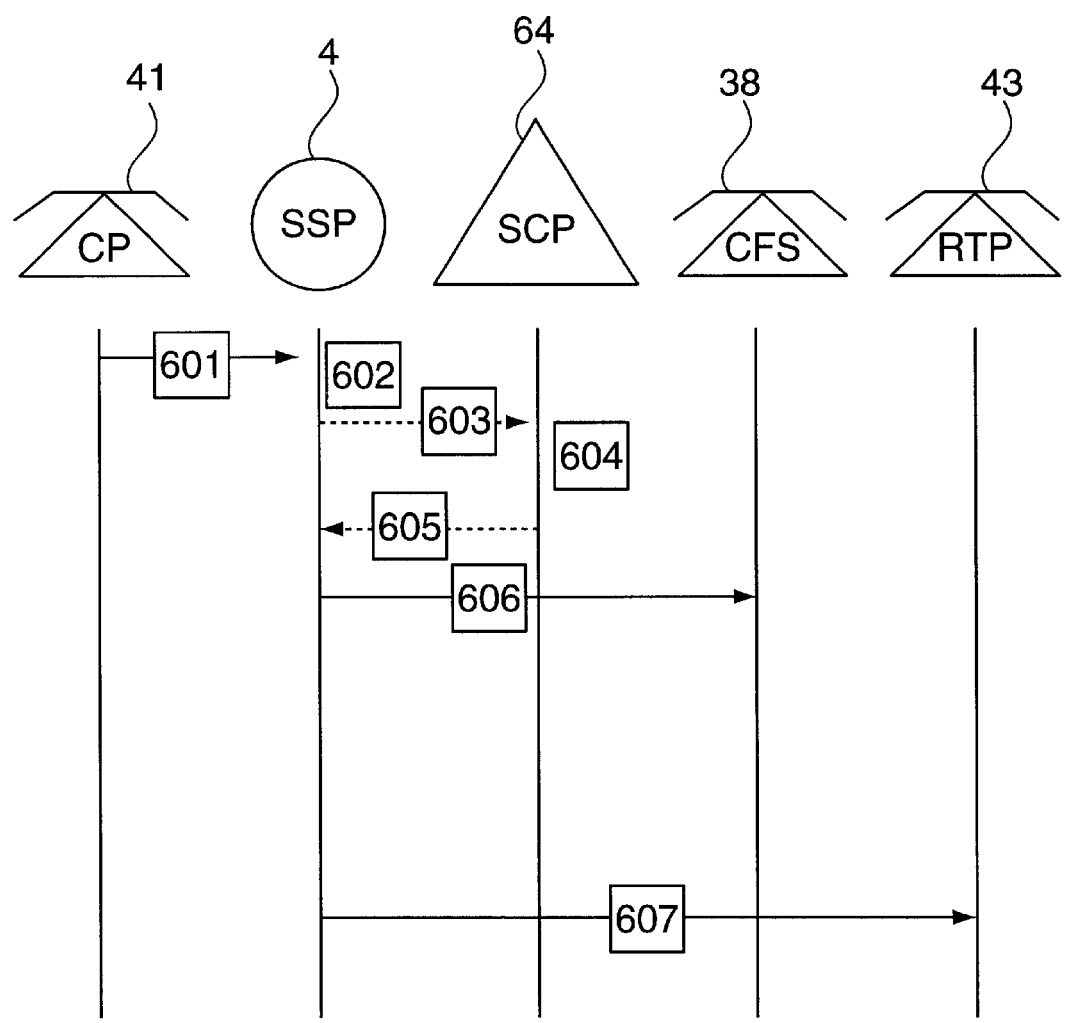

In the call flow processes illustrated in FIG. 5, the ping ring notification of a forwarded call is achieved using AIN next event list functionality. In accordance with another embodiment of the present invention, notification of a forwarded call is achieved through the use of a passive leg treatment. This approach results in the subscriber's phone providing a ping ring while allowing the call to be forwarded directly to the number programmed by the subscriber. FIG. 6 illustrates call forwarding of all calls with notification through the use of a passive call leg treatment.

The call forwarding process illustrated in FIG. 6 begins in step 601 with a call originating from the calling party (CP) phone 41 being initiated by a caller dialing the subscriber's telephone number. The call initiated in step 601 is routed to the subscriber's terminating telephone switch 4. In step 602, call processing is halted in response to activation to a TAT trigger set on the subscriber's line at the subscriber's terminating switch 4. With call processing paused, in step 603, a query for call processing instructions is generated and transmitted to the SCP 64. The query includes calling party and called party ID information, e.g., the telephone number of the calling party 41 and the telephone number of the called party, respectively.

In response to the query, the SCP 64 opens, using the called party ID as a keyword to identify a CPR, the subscriber's CPR. From the CPR the SCP 64 determines in step 604 that the user has activated forwarding of all calls with notification. Based on this information, the SCP generates and transmits, in step 605, a Forward Call Response Message with a preprogrammed forward to telephone number obtained from the subscriber's CPR. A passive leg treatment #68 is also attached to the Forward Call Response Message, which is transmitted in step 605 to the SSP 2.

In response to the passive leg treatment portion of the message, in step 606 the SSP 2 causes a ping-ring to occur on the called party's phone. Since this portion of the call is a passive leg treatment, if the subscriber picks up the handset in response to the ping ring, the subscriber will not be connected to the calling party but will instead receive a dial tone. In addition to causing the ping-ring, in step 607, the SSP forwards the call to the preprogrammed number in response to the Forward Call Response message received from the SCP 64. This causes the call to be forwarded to telephone 43.

The use of a passive leg treatment to provide call forwarding notification takes advantage of a telephone switch's ability to generate different ping rings. In accordance with the present invention, distinctive ping rings may be provided to the caller via different passive leg treatments, identified using different numbers. Each of the differently numbered passive leg treatments may have a distinctive ring.

For purposes of explanation, the ping ring notification feature of the present invention has been explained in the context where all calls are forwarded. However, it can be easily used in conjunction with other call forwarding services such as selective call forwarding and follow-me service. In accordance with one feature of the invention, different distinctive rings are used when notifying a customer of calls forwarded by different call forwarding services. In addition, in the case of call forwarding services where different calls are forwarded to different locations, e.g., different destination telephone numbers, such as can be the case with selective call forwarding, different distinctive rings can be used to inform a subscriber of the forwarding of a call to each of the different possible destination numbers specified by the subscriber.

Figure 7:
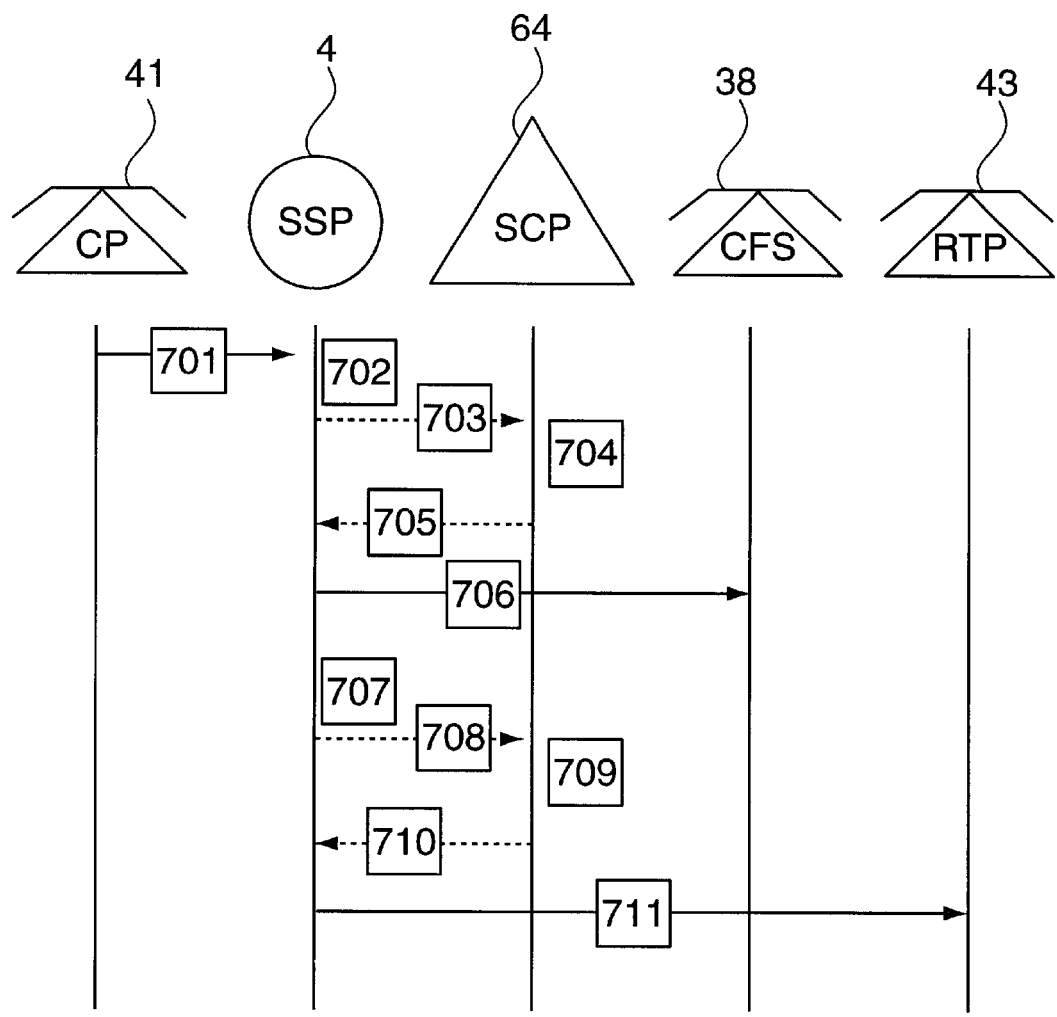

As discussed above, CFONA service involves the forwarding of calls directed to a telephone number which go unanswered. FIG. 7 illustrates the call flow associated with the forwarding of calls to a subscriber's phone 41 which goes unanswered for a preselected period of time, e.g., a time period corresponding to a number of rings specified by the subscriber and stored as part of the subscriber's CPR.

The call forwarding process illustrated in FIG. 7 begins in step 701 with a call originating from the calling party (CP) phone 41 being initiated by a caller dialing the subscriber's telephone number. The call initiated in step 701 is routed to the subscriber's terminating telephone switch 4. In step 702, call processing is halted in response to activation to a TAT trigger set on the subscriber's line at the subscriber's terminating switch 4. With call processing paused, in step 703, a query for call processing instructions is generated and transmitted to the SCP 64. The query includes calling party and called party ID information, e.g., the telephone number of the calling party 41 and the telephone number of the called party, respectively.

In response to the query, the SCP 64 opens, using the called party ID as a keyword to identify a CPR, the subscriber's CPR. From the CPR the SCP 64 determines in step 704 that the user has previously activated CFONA and that the user does not have the forward all calls service active. Based on this information, the SCP 64 generates and transmits, in step 705, a Termination Response message with a TNoAnswer NEL to the SSP 2. The time on the NEL, used as a no answer timer, is set to the time period in seconds, previously specified by the subscriber and stored in the subscriber's CPR. The time in seconds may be generated from a specified number of rings (ring count) multiplied by the average time per ring, e.g., 3 rings×6 seconds per ring=18 seconds, in the case where users are allowed to specify the number of rings as opposed to seconds.

In step 706 the SSP 4 rings the party in response to the Termination Response message and sets the timer which keeps track of the duration of the ring. Assuming the call goes unanswered for the time period specified by the subscriber who was called, into the time out condition, step 707, the NEL will time out at the SSP 4. In response the SSP 4 seeks additional call processing instructions from the SCP 64. To obtain additional call processing instructions, in step 708, the SSP 4 transmits a TNoAnswer NEL to the SCP 64. In step 709, the SCP 64 responds to the TnoAnswer NEL by consulting control logic including next event list information in the subscriber's CPR to determine the action to take next. Based on the information in the subscriber's CPR, the SCP 64 generates a signal to stop the SSP 4 from ringing and a Forward Call Response message with a preprogrammed forward to telephone number, e.g., the telephone number the subscriber indicated calls should be forwarded to, obtained from the subscriber's CPR. The signal to stop the ringing and the Forward Call Response message is transmitted in step 710 to the SSP 4. In response the SSP 4 stops the ringing. Then, in response to the Forward Call Response message, the SSP 4 forwards the call to the telephone number which was previously programmed by the subscriber via either the IVR IP 10 or an Internet connection. The routing of the call to the phone 43 indicated by the programmed telephone number occurs in step 711.

Figure 8:
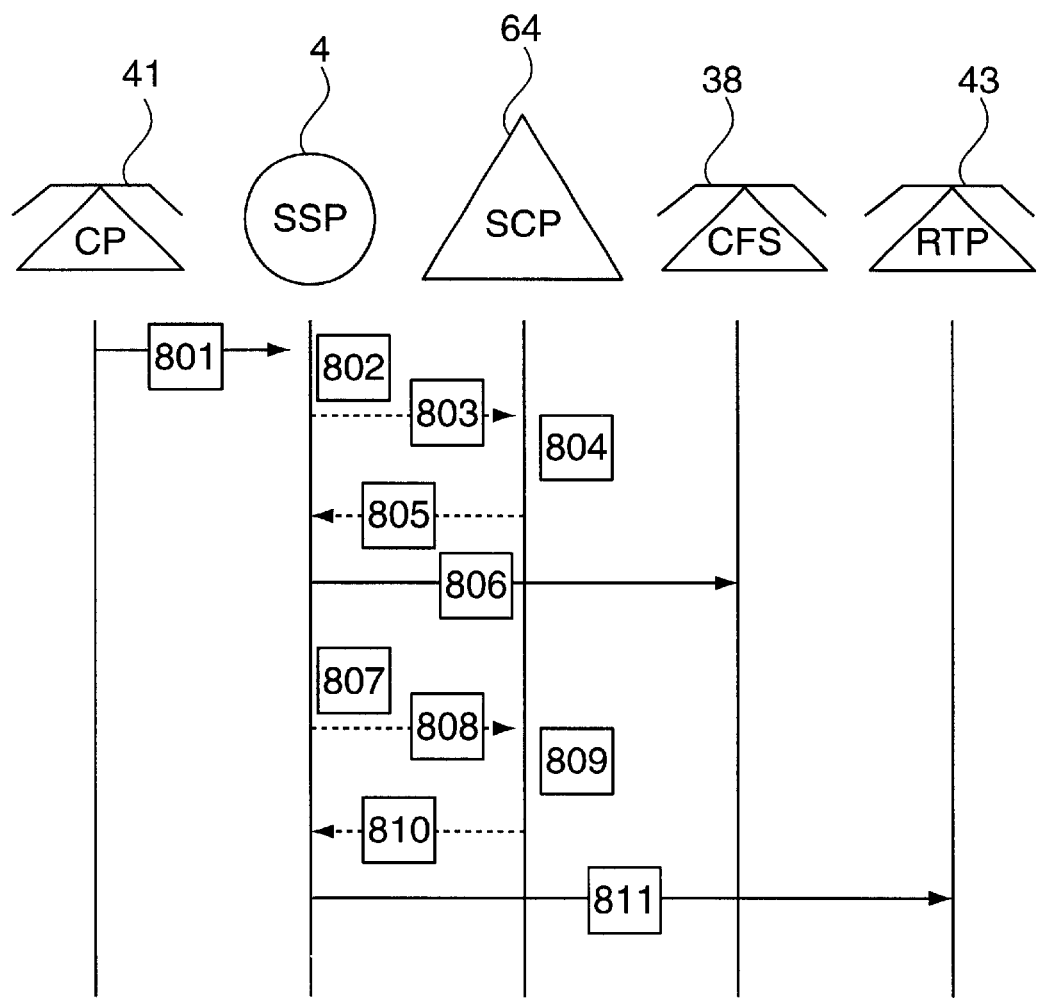

Call forwarding on busy (CFOB) service will now be explained with reference to FIG. 8. The call forwarding process illustrated in FIG. 8 begins in step 801 with a call originating from the calling party (CP) phone 41 being initiated by a caller dialing the subscriber's telephone number. The call initiated in step 801 is routed to the subscriber's terminating telephone switch 4. In step 802, call processing is halted in response to activation to a TAT trigger set on the subscriber's line at the subscriber's terminating switch 4. With call processing paused, in step 803, a query for call processing instructions is generated and transmitted to the SCP 64. The query includes calling party and called party ID information, e.g., the telephone number of the calling party 41 and the telephone number of the called party (the subscriber's telephone number), respectively.

In response to the query, the SCP 64 opens, using the called party ID as a keyword to identify a CPR, the subscriber's CPR. From the CPR the SCP 64 determines in step 804 that the user has previously activated CFOB and that the user does not have the forward all calls service active. Based on this information, the SCP 64 generates and transmits, in step 805, a Termination Response message with a TBusy NEL to the SSP 2.

In step 806 the SSP 64 attempts to place the call to the subscriber, e.g., attempts to ring, the called subscriber in response to the Termination Response message. Assuming a busy condition is encountered, in step 807 the SSP 2 determines that the called subscriber's line is busy. As a result of the Tbusy NEL, the SSP 4 will seek additional call processing instructions from the SCP 64 in response to the busy condition. To obtain additional call processing instructions, in step 808, the SSP 4 transmits a message to the SCP 64 including a TBusy NEL. In step 809, the SCP 64 responds to the TBusy NEL by consulting next event list information in the subscriber's CPR to determine the action to take next. Based on the information in the subscriber's CPR, the SCP 64 generates a Forward Call Response message with a preprogrammed forward to telephone number, e.g., the telephone number the subscriber indicated calls should be forwarded to in the event of a busy condition, obtained from the subscriber's CPR. This message is transmitted in step 810 to the SSP 4. In response to the Forward Call Response message, the SSP 4 forwards the call to the telephone number, which was previously programmed by the subscriber via either the IVR IP 10 or an Internet connection. The routing of the call to the phone 43 indicated by the programmed telephone number occurs in step 811.

In one exemplary follow-me service of the present invention, calls to a subscriber's line which goes unanswered are re-directed to one or more telephone numbers specified by the subscriber, e.g., in a follow-me list of numbers. When a forwarded call to a number on the list goes unanswered for a preselected period of time, it is forwarded to the next number on the list. This continues until a busy condition is encountered or the list of follow-me numbers is exhausted. If a user has voice mail, a busy signal or exhaustion of the follow-me list results in the caller being transferred, e.g., re-directed to voice mail. AIN next event list functionality is used to implement the follow me service in accordance with the present invention.

Figure 9:
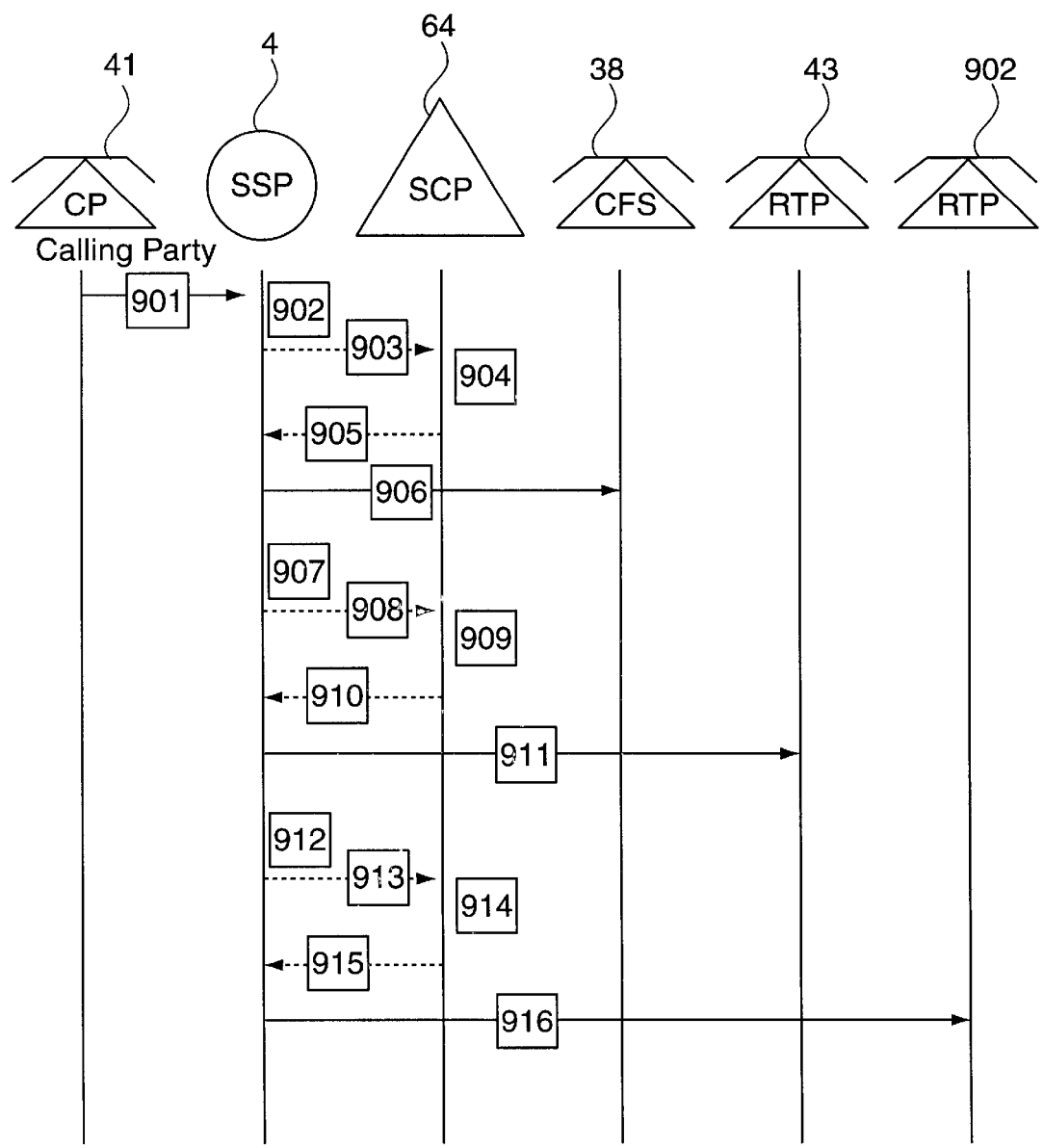

FIG. 9 illustrates the call flow associated with the forwarding of calls to a subscriber's phone 41, in accordance with a follow-me service of the present invention. The call forwarding process illustrated in FIG. 9 begins in step 901 with a call originating from the calling party (CP) phone 41 being initiated by a caller dialing the subscriber's telephone number. The call initiated in step 901 is routed to the subscriber's terminating telephone switch 4. In step 902, call processing is halted in response to activation to a TAT trigger set on the subscriber's line at the subscriber's terminating switch 4. With call processing paused, in step 903, a query for call processing instructions is generated and transmitted to the SCP 64. The query includes calling party and called party ID information, e.g., the telephone number of the calling party 41 and the telephone number of the called party, respectively.

In response to the query, the SCP 64 opens, using the called party ID as a keyword to identify a CPR, the subscriber's CPR. From the CPR the SCP 64 determinesin step 904 that the user has follow-me service activated and that the user does not have the forward all calls service active. Based on this information, the SCP 64 generates and transmits, in step 905, a Termination Response message with a TNoAnswer NEL to the SSP 4. The time on the NEL, used as a no answer timer, is set to a time period previously specified by the subscriber, e.g., as a ring count, and stored in the subscriber's CPR for use in regard to the follow-me service.

In step 906 the SSP 4 rings the party in response to the Termination Response message and sets the timer which keeps track of the duration of the ring. Assuming the call goes unanswered for the time period specified by the subscriber who was called, in step 907, the NEL will time out at the SSP 4 and the SSP 4 will halt the ring and seek additional call processing instructions from the SCP 64. To obtain additional call processing instructions, in step 908, the SSP 4 transmits a TNoAnswer NEL to the SCP 64. In step 909, the SCP responds to the TNoAnswer NEL by consulting next event list information in the subscriber's CPR to determine the action to take next. Based on the information in the subscriber's CPR, the SCP 64 generates a Forward Call Response message with a preprogrammed forward to telephone number, e.g., the first telephone number in the subscriber's follow-me list included in the subscriber's CPR. This message along with a TnoAnswer and TBusy NEL are transmitted in step 910 to the SSP 4. In response to the Forward Call Response message, the SSP 2 forwards the call to the specified telephone number and activates the no-answer timer assuming that the line is not busy. If it were busy a TBusy would be returned to the SCP 64. The routing of the call to the phone 43 indicated by the programmed telephone number occurs in step 911.

Assuming the forwarded call goes unanswered for the time period specified by the follow-me subscriber, in step 912, the NEL will time out at the SSP 4. To obtain additional call processing instructions, in step 913 the SSP 4 transmits a TNoAnswer NEL to the SCP 64. In step 914, the SCP 64 responds to the TNoAnswer NEL by consulting service logic including the next event list information in the subscriber's CPR to determine the action to take next. Based on the control logic including information in the subscriber's CPR, the SCP 64 generates a signal to stop the rings and a Forward Call Response message with a preprogrammed forward to telephone number, e.g., the next telephone number in the subscriber's follow-me list included in the subscriber's CPR. The signal to stop the rings and the Forward Call Response message along with a TnoAnswer and TBusyNEL, are transmitted in step 915 to the SSP 4. The SSP 4 stops the rings. Then, in response to the Forward Call Response message, the SSP 4 forwards the call to the specified telephone number and, assuming a busy signal is not encountered, activates the no-answer timer. The routing of the call to the phone 902 indicated by the next programmed telephone number in the subscriber's follow-me list occurs in step 916.

Steps 912 through 916 will be repeated until the call is answered or there are no numbers left on the subscriber provided list of numbers in the CPR to forward the calls to. As discussed above, if the call to the last follow-me number provided by the subscriber goes unanswered, in one embodiment this results in the call being transferred to voice mail. In such a case, the voice mail number is simply provided as the last telephone number in the follow-me list of numbers following the subscriber provided numbers.

In the above described follow-me service, encountering of a busy signal as indicated by the SCP 64 receiving a busy NEL message from SSP 4, will result in the SCP 64 causing the call to be forwarded to the next number in the subscriber's follow-me list via use of a Forward Call Response message, TnoAnswer and Tbusy NEL as is the case when the call goes unanswered.

Figure 10A:
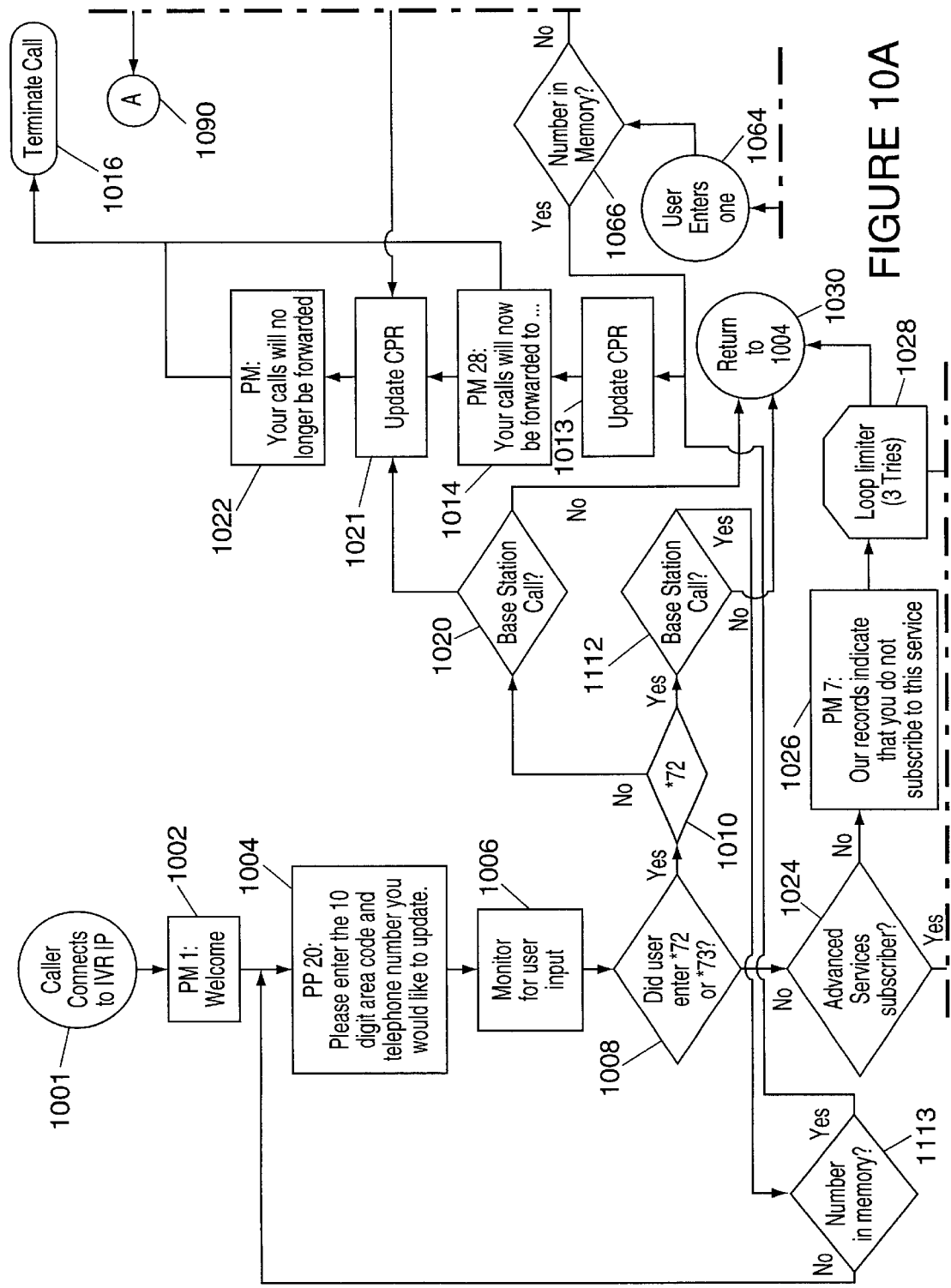
FIGS. 10–13 are flow diagrams illustrating steps, messages, and data associated with setting up, configuring, and using various call forwarding and other telephone services in accordance with the present invention.
Figure 10B:
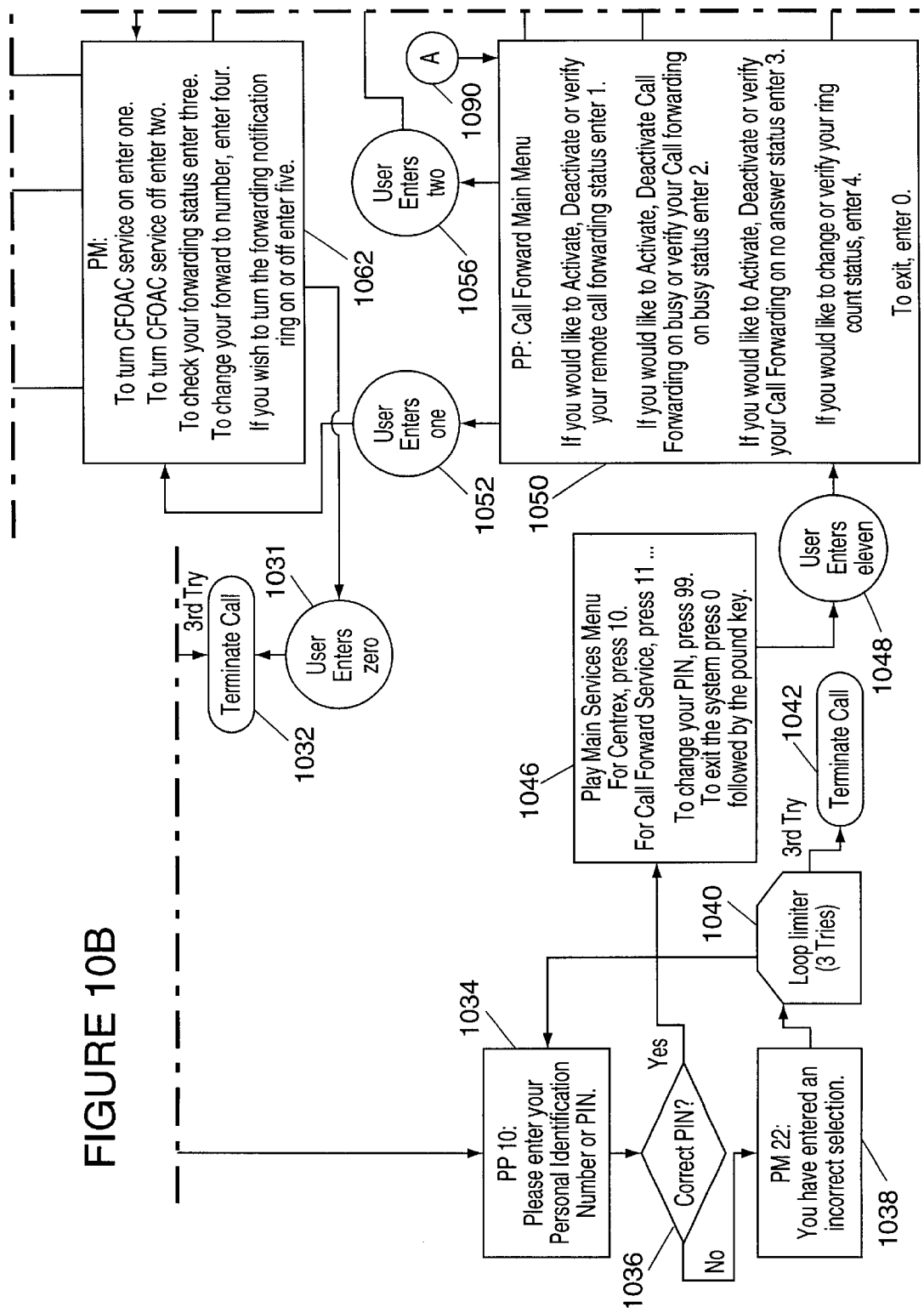
Figure 10C:
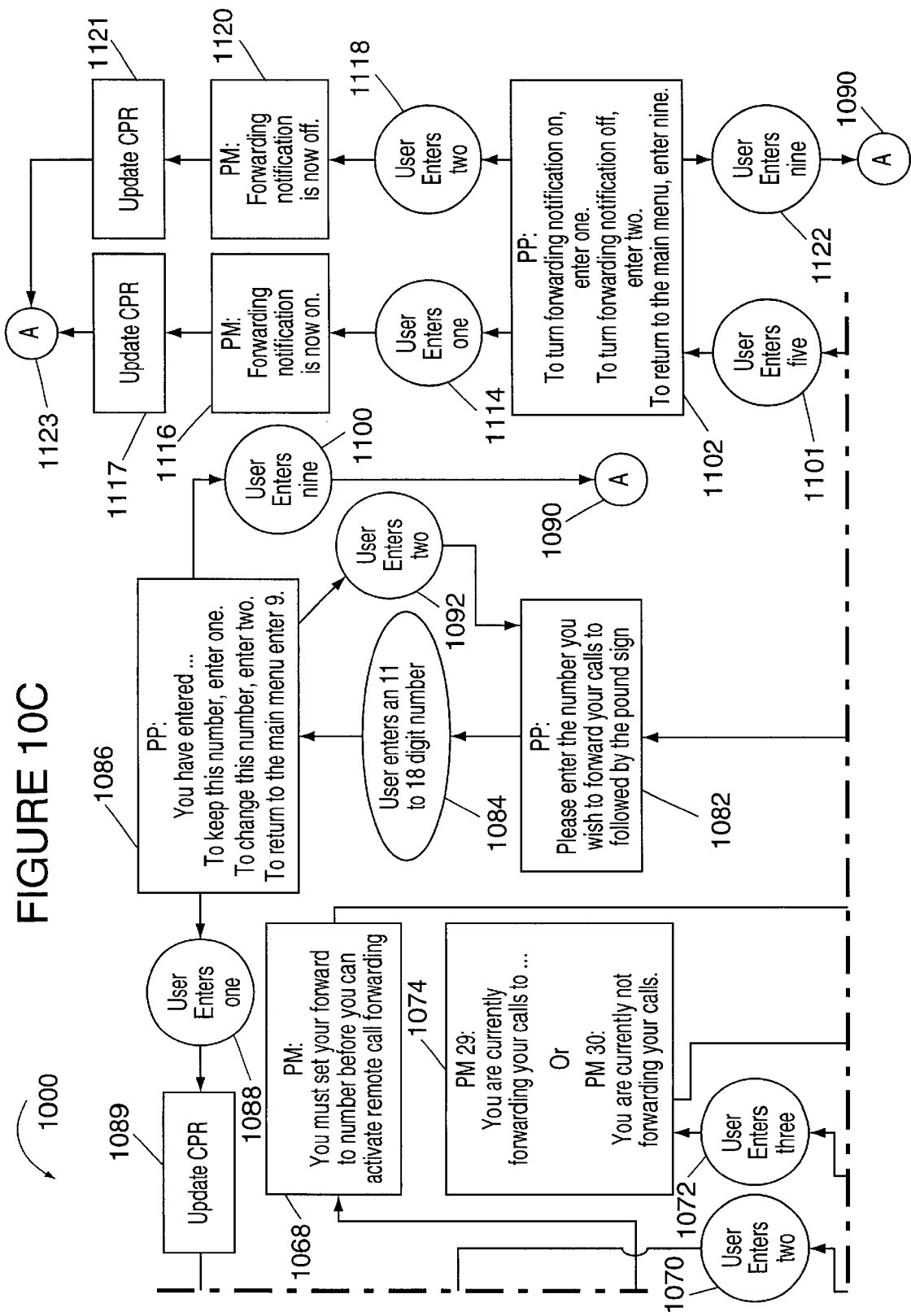

An exemplary process 1000 of collecting and updating information, e.g., via IVR IP 10, relating to a call forwarding subscriber who subscribes to call forwarding of all calls (CFOAC) service, call forwarding on busy (CAFOB) service and call forwarding on no answer (CFONA) service will now be described with reference to FIG. 10.

Note that the subscriber is allowed to enable/disable any of the call forwarding services. The subscriber can also provide and/or change the telephone number(s) calls are to be forwarded to for each of the call forwarding services, and set the number of rings which are to be allowed to occur before forwarding of a call when CFONA service is enabled. Note also that the process 1000 includes functionality which allows a subscriber to easily enable/disable CFOAC service using a simple * code, e.g., *72 and *73, which can be entered once connected to the IVR IP 10.

The process 1000 begins in step 1001 with a subscriber connecting to the IVR IP 10, e.g., by dialing a telephone number corresponding to the IVR IP 10. Playing of messages, prompts and the collection of information by the IVR IP 10 occurs under control of the SCP 64. In addition, collected information is passed from the IP 10 to the SCP 64 for processing.

Once connected to the IP 10, in play message (PM) step 1002, the subscriber is played a welcome message. Then in play prompt (PP) step 1004, the IP 10 plays the subscriber a prompt, prompt 20, which states: "Please enter the 10 digit area code and telephone number you would like to update".

Next, in step 1006 the IP 10 monitors for user input. Once input is received operation proceeds to step 1008 wherein a determination is made as to whether the user entered a * function code as opposed to a phone number. In particular, if it is determined that a *72, or *73 code was received in step 1008 operation proceeds to step 1010. However, if it is determined that *72 or *73 was not received in step 1008, operation proceeds to step 1024.

Step 1010 is used to determine whether a *72 (call forward enable code) or a *73 (call forward disable) code was received. If in step 1010 it is determined that a *72 code was received operation proceeds to step 1112.

If a *72 code was received, it means that the subscriber wishes to enable CFOAC service with the calls being forwarded to the last number used for this purpose, e.g., the CFOAC forward to telephone number stored in the caller's CPR. In step 1112, automatic number identification (ANI) information is used to identify the telephone from which the subscriber is calling. The telephone number information is then used by the SCP 64 to determine if the station is a base station, e.g., a telephone corresponding to a call forwarding subscriber for which a CPR exists.

In step 1112, if it is determined that the call is placed from a telephone which is not a call forwarding base station, operation returns to prompt step 1004 via return step 1030.

However, if the phone from which the call is placed is determined in step 1112 to be a call forwarding base station, operation proceeds to step 1113, wherein the CPR corresponding to the telephone from which the call is placed is examined to determine if a forward to telephone number has been stored in the CPR for use with CFOAC service. The stored number will be the number set by the subscriber for calls to be forwarded to by the CFOAC service. Frequently, this will be the last telephone number to which calls were forwarded using CFOAC service.

If in step 1113 it is determined that a forward to number does not already exist in memory for CFOAC service, operation proceeds once again to prompt step 1004.

However, if in step 1113 , it is determined that a CFOAC forward to telephone number already exists in memory operation proceeds to step 1013, wherein the subscriber's CPR is updated to indicate that CFOAC service is active. Then, in play message step 1014, the subscriber is played message 28 which states: "Your calls will now be forwarded to: [forward to telephone number]." From step 1014, operation proceeds to step 1016 wherein the call is terminated.

If in step 1010, if it is determined that a *72 code was not received, indicating that a *73 (cancel call forwarding) code was received, operation proceeds from step 1010 to step 1020.

In step 1020, automatic number identification (ANI) information is used to identify the telephone from which the subscriber is calling. The telephone number information is then used by the SCP 64 to determine if the telephone is a base station, e.g., a telephone corresponding to a call forwarding subscriber for which a CPR exists.

In step 1020, if it is determined that the call is placed from a telephone which is not a call forwarding base station, operation returns to prompt step 1004 via return step 1030.

However, if the phone from which the call is placed is determined in step 1020 to be a call forwarding base station, operation proceeds to step 1021, wherein the CPR corresponding to the telephone number is updated to indicate that CFOAC service is disabled and the CFOAC logic in the CPR is updated to no longer forward calls. In this manner call forwarding is canceled. Then in play message step 1022, the subscriber is played the message "Your calls will no longer be forwarded" confirming to the subscriber that call forwarding has been canceled. Operation proceeds from step 1022 to step 1016 wherein the call is terminated.

The above discussion has focused on the steps associated with enabling/disabling an AIN based call forwarding service, in accordance with the present invention, using a simple code entered from the telephone corresponding to the call for which forwarding service is provided.

Enabling/disabling of call forwarding service can be performed from other phones than the one for which call forwarding service is provided. In addition, modification of call forwarding service information, e.g., telephone numbers where calls are to be redirected to, can be entered from any phone from which the IVR IP 10 can be contacted. In cases of remote access or the changing of call forwarding information such as redirected to phone numbers, for security reasons, entry of the telephone number for which information is to be changed and a personal identification number (PIN) is required.

In the event that a telephone number as opposed to a *72 or *73 code is detected in step 1006, operation will proceed from step 1008 to step 1024. In step 1024, the received telephone number information is examined to determine if the received telephone number corresponds to an advanced, e.g., call forwarding or Centrex, telephone service subscriber. This is done by checking the CPR records in the SCP 64 corresponding to service subscribers, to see if a CPR for the received telephone number exists.

If it is determined that the received telephone number does not correspond to an advance service subscriber, operation proceeds to play message step 1026. In step 1026, the caller is played a message notifying the caller that records indicate that they do not subscribe to a service supported by the IP 10. Operation then proceeds to step 1028 which is a loop limiter step. A counter is maintained in step 1028 to determine the number of times a caller passes through step 1028. When the counter reaches three, indicating that the caller was given 3 tries to provide the requested information, the call is terminated in step 1032. However, if the user has not used up the three tries, operation proceeds once again to play prompt step 1004 via return step 1030.

If in step 1024, a CPR corresponding to the received telephone number is identified, indicating that the caller is an advanced service subscriber, operation proceeds to play prompt step 1034. In step 1034, prompt 10 is played which states: "Please enter your personal identification number or PIN". The PIN received from the caller is compared in step 1036 to the PIN included in the CPR identified in step 1024 using the received telephone number. If, in step 1036, it is determined that the received PIN is incorrect, operation proceeds to step 1038.

In play message step 1038, message 22 is played to the caller which states "You have entered an incorrect selection." Loop limiter step 1040 is then encountered. If a counter maintained in step 1040 has reached 3, indicating that the caller was given 3 chances to enter the PIN, operation proceeds to step 1042 and the call is terminated. Otherwise operation proceeds once again to play prompt step 1034 to give the caller another opportunity to enter the correct PIN.

When, in step 1036 it is determined that the caller entered the correct PIN, operation proceeds to play main menu step 1046. In step 1046, the user is told to press "10" for Centrex, "11" for Call forward service, "99" to change his/her PIN, and "0" to exit the system.

Following presentation of the main menu, the caller's input is monitored and processing branches depending on the user input. A case statement with each possible user input may be used to implement the branching function. Processing control flow step 1048 represents the detection of an input value of 11 and the resulting branching to step 1050. Processing following the selection of other main menu items will not be discussed for the purposes of brevity.

Play prompt step 1050 involves playing the caller a main Call Forward Menu. The menu presents the user with four choices. It states: "If you would like to activate, deactivate or verify your remote call forwarding status enter 1. If you would like to activate, deactivate or verify your call forwarding on busy status enter 2. If you would like to activate, deactivate or verify your call forwarding on no answer status enter 3. If you would like to change or verify your ring count status enter 4."

Operation proceeds from step 1050 to another step based on the user's input which is monitored and used to determine processing flow. As discussed above a case statement may be used to implement the processing control flow steps.

If the user enters a "1" indicating that the user seeks to control their CFOAC service or receive information about the status of the service, operation proceeds through processing flow control step 1052 to play menu step 1062.

In step 1062 the user is presented with a CFOAC service menu by being played the following exemplary message: "To turn CFOAC service on enter one. To turn CFOAC service off enter two. To check your forwarding status enter three. To change your forward to number or set call forwarding notification enter four. If you wish to turn the forwarding ring notification on or off enter five."

If the user enters a "1" indicating that the user seeks to turn CFOAC service on, the user input is detected and processing proceeds through processing flow control step 1064 to step 1066. In step 1066 a check of the caller's CPR is made to determine if a CFOAC forward to telephone number already exists in memory. If the CFOAC forward to number is already in memory, operation proceeds to step 1013 wherein the CPR is updated to indicate CFOAC service is active.

If, in step 1066 it is determined that the CFOAC forward to number does not already exist in memory, operation proceeds to play message step 1068. In step 1068 the caller is notified "You must set your forward to number before you can activate remote call forwarding." Processing then returns to play menu step 1062.

If, following step 1062, the user enters two, operation proceeds via processing flow control step 1070 to previously described step 1021 wherein the CPR is updated to indicate that CFOAC service is disabled.

If, following step 1062, the user enters three, operation proceeds via processing flow control step 1072 to play message step 1074. In step 1074, the SCP 64 determines whether CFOAC service is enabled or disabled for the caller. If CFOAC service is enabled, in step 1074 the caller is played the message "You are currently forwarding your call to [CFOAC forward to number]". However, if CFOAC service is disabled, the caller is played the message: "You are currently not forwarding your calls." Operation proceeds from step 1074 back to play message step 1062.

If, following step 1062, the user enters four, operation proceeds via processing flow control step 1076 to play prompt step 1082.

In step 1082 the caller is played the prompt "Please enter the number you wish to forward your calls to followed by the pound sign." In step 1084, the user enters an 11 to 18 digit number. Then in step 1086 the received number is played back to the caller as part of a confirmation message and the caller is requested to enter one to keep the number, two to change the number, and 9 to return to the main menu.

If, the user enters a one, in response to the prompt provided in step 1086, operation proceeds via processing control flow step 1088 to CPR update step 1089. In step 1089, the CPR is updated to include the CFOAC forward to number entered by the caller. From step 1089 the caller is returned to the main call forwarding menu presentation step 1050, via connecting node 1090.

If, following step 1086, the user enters a two the user is returned to step 1082 via processing control flow step 1092. Alternatively, if following step 1086, the user enters a nine, operation returns to main call forwarding menu presentation step 1050 via processing control flow step 1100 and connecting node 1090.

If, following the menu provided in step 1062, the caller enters five, operation proceeds from step 1062, via processing flow control step 1101, to play prompt step 1102. In step 1102, the caller is played the prompt: "To turn forwarding notification on enter one. To turn forwarding notification off enter two. To return to the main menu enter nine."

If, in response to the prompt provided in step 1102, the caller enters one, operation proceeds via processing control flow step 1104 to step 1116. In step 1116, the caller is played the message "Call forwarding notification is now on." Then in step 1117 the subscriber's CPR is updated to enable call forwarding notification. With the CPR updated processing returns to the call forward main menu presentation step 1050 via connecting node 1123.

If, in response to the prompt provided in step 1102, the caller enters two, operation proceeds from step 1102 via processing control flow step 1118 to step 1120. In step 1120, the caller is played the message "Call forwarding notification is now off." Then in step 1120 the subscriber's CPR is updated to disable call forwarding notification. With the CPR updated processing returns to the call forward main menu presentation step 1050 via connecting node 1123.

If, in response to the prompt provided in step 1102, the caller enters nine, operation proceeds from step 1102 via processing control flow step 1122 and connection node 1090 to the call forward main menu presentation step 1050.

Figure 11:
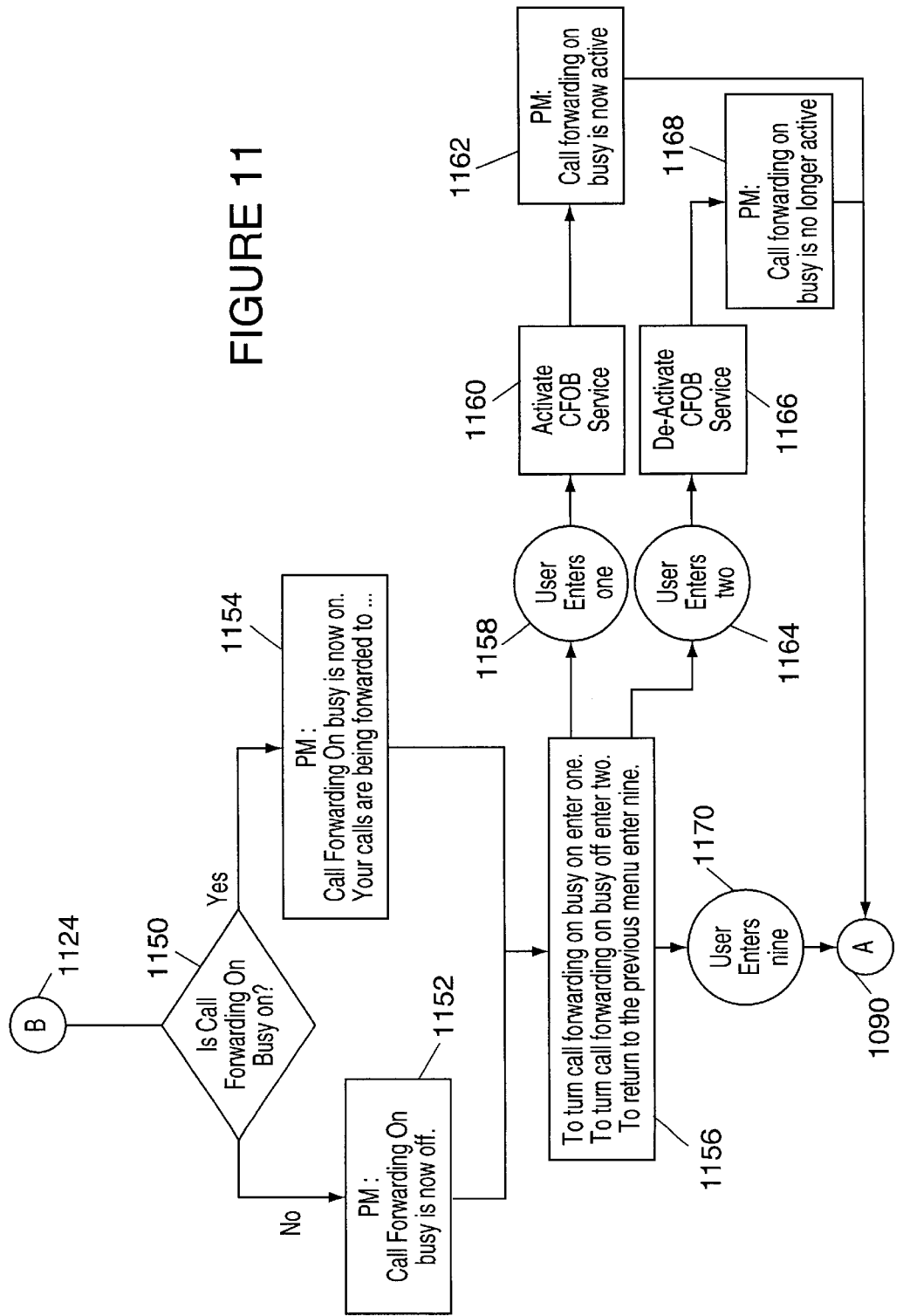

If, after being presented with the main call forwarding menu in step 1050, the caller enters two, operation proceeds from step 1050, via processing control flow step 1056 and connecting node 1124 to step 1150, illustrated in FIG. 11.

In step 1150, the SCP 64 accesses the CPR to determine if CFOB service is active. If in step 1150 it is determined that the caller's CFOB service is active, operation proceeds to play message step 1154 wherein the caller is notified that call CFOB service is on. In step 1154 the caller is also told the number to which calls are being forwarded as part of the CFOB service. From step 1154 operation proceeds to step 1156.

In step 1150, if the SCP 64 determines that CFOB service is not active, operation proceeds to step 1152 wherein the caller is played a message indicating that CFOB service is now off. Operation then proceeds to play prompt step 1156.

In step 1156, the caller is prompted for input regarding control of CFOB service. In particular, the message played to the caller states: "To turn call forwarding on busy on enter one. To turn call forwarding on busy off enter two. To return to the previous menu enter nine."

If following step 1156, the caller enters one, operation proceeds via processing control step 1158 to step 1160. In step 1160, CFOB service is activated. This may involve, e.g., the SCP 64 updating the CPR to indicate that CFOB service is active. Operation then proceeds to play message step 1162 wherein the caller is notified that CFOB service is active. From step 1162 operation proceeds once again via connecting node 1090 to the play main call forwarding menu step 1050.

If following step 1156, the caller enters two, operation proceeds via processing control step 1164 to step 1166. In step 1166, CFOB service is deactivated. This may involve, e.g., the SCP 64 updating the CPR to indicate that CFOB service is not active. Operation then proceeds to play message step 1168 wherein the caller is notified that CFOB service is not active. From step 1168 operation proceeds once again via connecting node 1090 to the play main call forwarding menu step 1050.

If, in response to the menu presented in step 1156 the caller enters nine, operation proceeds via processing control step 1170 and node 1090 to the play main call forwarding menu step 1050.

Figure 12:
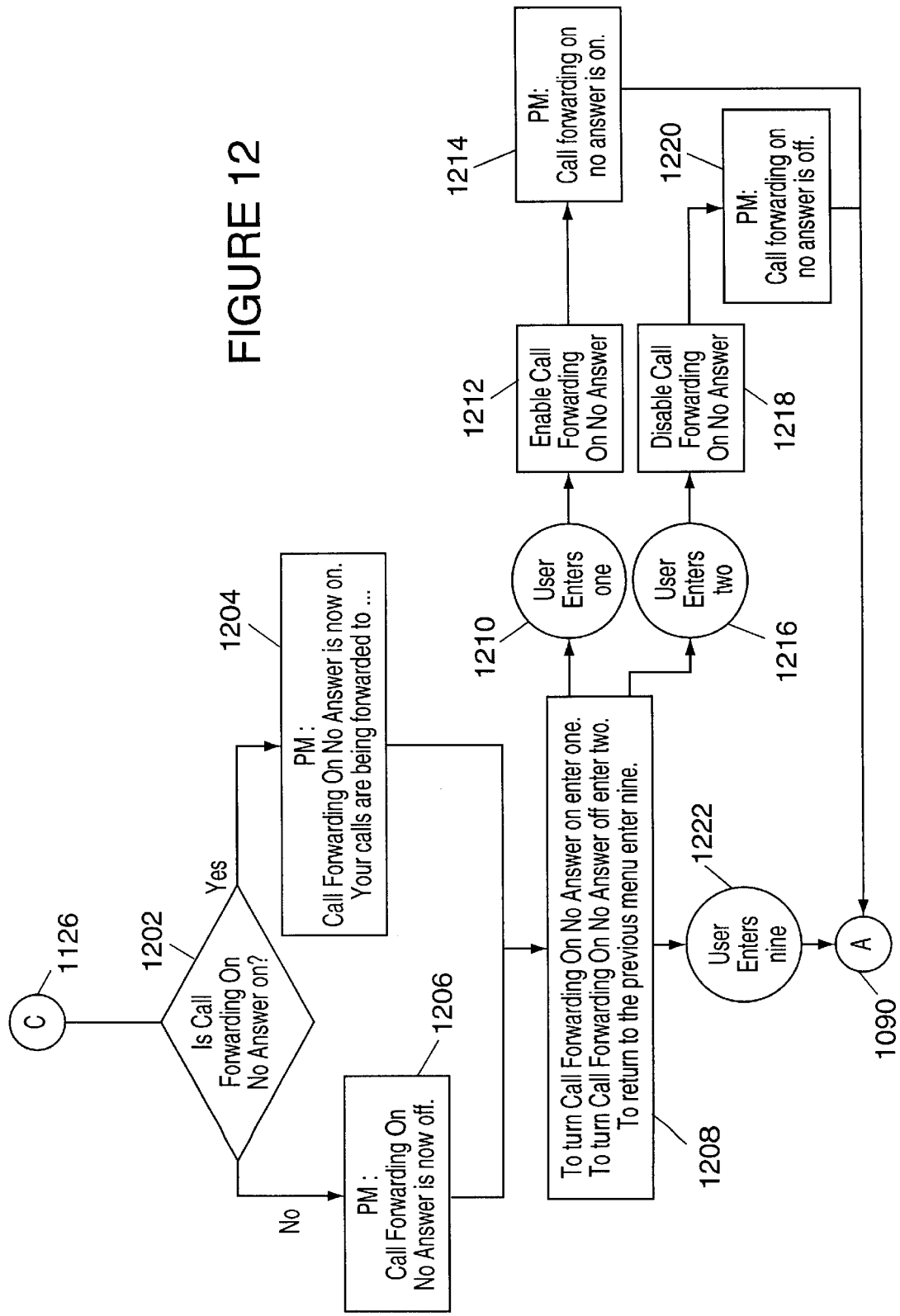

If, after being presented with the main call forwarding menu in step 1050 the caller enters three, operation proceeds from step 1050, via processing control flow step 1060 and connecting node 1126, to step 1202 illustrated in FIG. 12.

In step 1202, the SCP 64 accesses the CPR to determine if CFONA service is active. If in step 1202 it is determined that the caller's CFONA service is active, operation proceeds to play message step 1204 wherein the caller is notified that call CFONA service is on. In step 1204 the caller is also told the number to which calls are being forwarded as part of the CFONA service. From step 1204 operation proceeds to step 1208.

In step 1202, if the SCP 64 determines that CFONA service is not active, operation proceeds to step 1206 wherein the caller is played a message indicating that CFONA service is now off. Operation then proceeds to play prompt step 1208.

In step 1208, the caller is prompted for input regarding control of CFONA service. In particular, the caller is played a message which states: "To turn call forwarding on no answer on enter one. To turn call forwarding on no answer off enter two. To return to the previous menu enter nine."

If following step 1208, the caller enters one, operation proceeds via processing control step 1210 to step 1212. In step 1212, CFONA service is activated. This may involve, e.g., the SCP 64 updating the CPR to indicate that CFONA service is active and making any changes at the telephone's terminating switch 4 that may be required to activate the service e.g., setting of a TAT. Operation then proceeds to play message step 1214 wherein the caller is notified that CFONA service is active. From step 1214 operation proceeds once again via connecting node 1090 to the play main call forwarding menu step 1050.

If following step 1208, the caller enters two, operation proceeds via processing control step 1216 to step 1218. In step 1218, CFONA service is deactivated. This may involve, e.g., the SCP 64 updating the CPR to indicate that CFONA service is not active and making any changes at the telephone switch 4 required to deactivate the service e.g., disabling a TAT not used for other purposes. Operation then proceeds to play message step 1220 wherein the caller is notified that CFONA service is not active. From step 1220 operation proceeds once again via connecting node 1090 to the play main call forwarding menu step 1050.

If, in response to the menu presented in step 1208 the caller enters nine, operation proceeds via processing control flow step 122 and node 1090 to the play main call forwarding menu step 1050.

Figure 13:
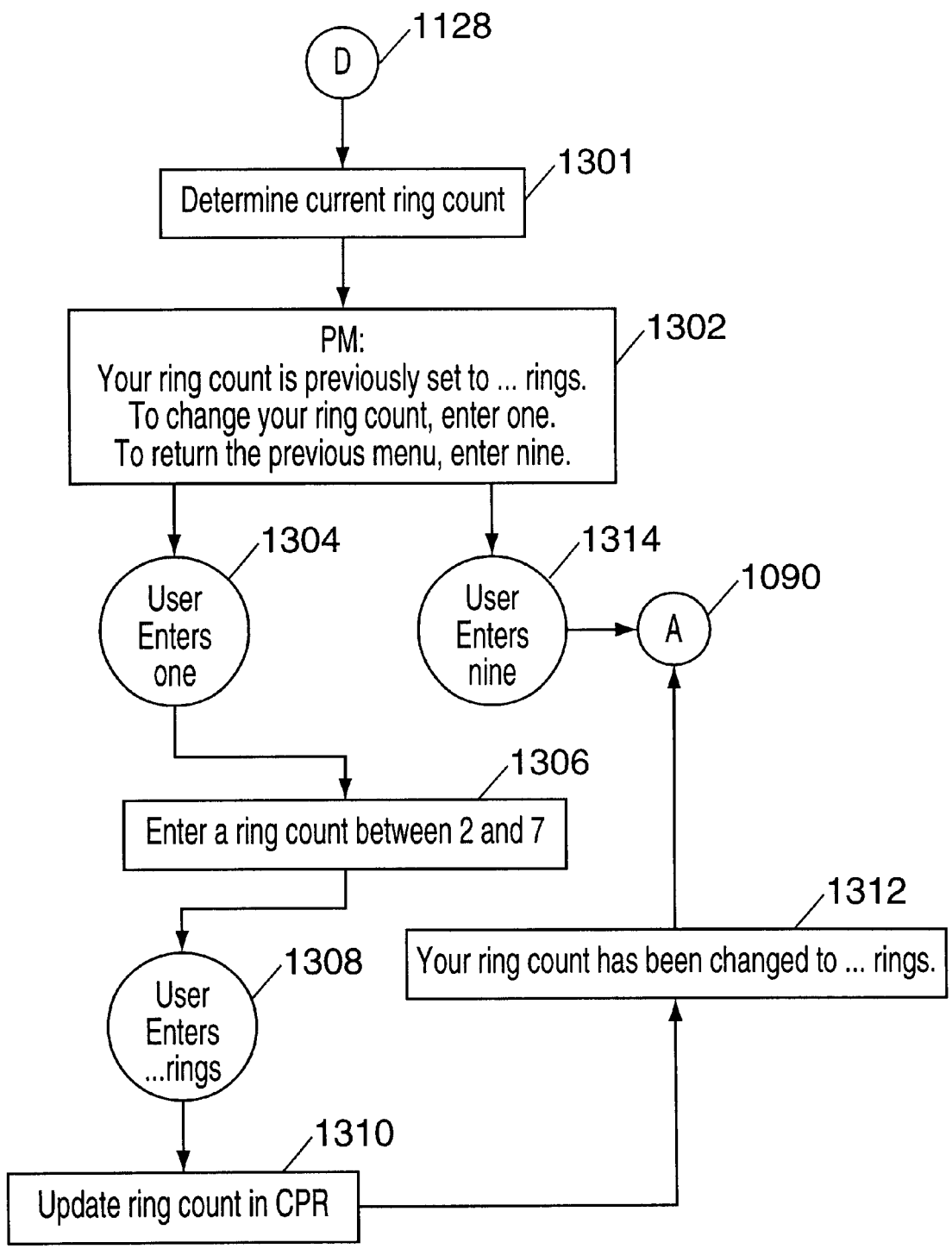

If, after being presented with the main call forwarding menu in step 1050 the caller enters four, operation proceeds from step 1050, via processing control flow step 1060 and connecting node 1128 to step 1301, illustrated in FIG. 13.

In step 1301, the SCP 64 determines from the CPR the current ring count to be used with call forwarding on no answer CFONA service. As discussed above, the ring count determines the time a phone is allowed to ring prior to the call being forwarded. A ring is normally 6 seconds with sound being generated during a portion of the ring and silence occurring during the rest of the ring.

The caller is notified of the current ring count setting in play message step 1302. In step 1302 the caller is also told to enter 1 to change the ring count or enter nine to return to the previous menu.

If, in response to the menu provided in step 1302, the caller enters one, operation proceeds via processing control flow step 1304 to step 1306. In step 1306, the caller is prompted to enter a new ring count between 2 and 7. In step 1308 the user enters a desired number of rings, e.g., 3. Then in step 1310 the ring count information in the CPR is updated. From step 1310 operation proceeds to play message step 1312. In step 1312, the caller is notified that the ring count has been changed to the value specified by the caller. Operation then returns to the play main call forwarding menu step 1050 via node 1090.

If, in response to the menu provided in step 1302 the caller enters a nine, operation proceeds from step 1302 via processing control flow step 1314 and node 1090 back to the main call forwarding menu step 1050 via node 1090.

If, following presentation of the main call forwarding menu in step 1050, a caller enters 0 indicating a desire to exit the system, operation proceeds via processing control step 1091 to step 1093 wherein the call is terminated.

While updating of the ring count information, call forwarding telephone number information and other information relating to various call forwarding services has been described through the use of IVR IP 10, the same information can be modified and updated via the Internet and a Web browser via the Internet customer access server 32 which, like the IVR IP 10, can interact with the SCP 64.

In the above discussed embodiments, once provisioned, a call forwarding service is enabled/disabled by making modifications to the SCP control logic, e.g., by modifying subscriber CPRs. In such embodiments, the TAT trigger set on the subscriber's line remains active even when call forwarding is not being used by the subscriber. If the TAT trigger is not being used to support other AIN based features, it may be deactivated at the SSP 4 when the call forwarding service for which it was set is disabled. In one such embodiment this is accomplished by sending an Update command to the SSP 4 instructing it to turn a TAT off when the subscriber disables call forwarding. This approach has the advantage of reducing the processing load on the SCP since the SCP 64 will no longer be queried for call processing instructions in cases where the calls are not to be forwarded and other AIN services are not being provided to the subscriber. In such an embodiment, the TAT trigger used to support the call forwarding service is turned on by the SCP 64 sending the SSP another update command when call forwarding is re-enabled. In addition, when call forwarding is re-enabled, the subscriber's CPR is also updated to reflect that call forwarding is active.

As discussed above, call forwarding on no answer (CFONA) service is used, in one embodiment of the present invention, to serve as the front end to a voice mail system. In such an embodiment, voice mail customers are allowed to set the ring count stored in the SCP from their voice mail system as well as from their call forwarding management system. In the FIG. 1 embodiment, the voice mail IP 30 includes a ring count change interface 31 which allows voice mail service subscribers coupled to the voice mail IP to change their ring count information without having to access IVR IP 10. Thus, ring count information stored in a subscriber's CPR 73 can be changed though IVR IP 10, Voice mail IP 30 or through use of the Internet customer access server 32.

Optional call forwarding notification is provided in various embodiments for call forwarding or no answer (CFONA) service and selective call forwarding service in the same manner as described above in regard to call forwarding of all calls service. However, as discussed above, different rings may be used to notify a caller of calls forwarded by the different services. For example, a first ping-ring may be used to notify of calls forwarded by the selective call forwarding service and a different ping-ring used to notify of calls forwarded by the CFONA service.

Numerous variations on the above described methods and apparatus are possible without departing from the scope of the invention.

What is claimed is:

1. A method of operating a telephone switch to process telephone calls, comprising:
    setting a trigger on a first telephone line of a call forwarding service subscriber;
    in response to activation of said trigger by a call directed to said first telephone line, sending a message to a service control point;
    receiving a control message from said service control point; and
    in response to said message from said service control point, providing a call forwarding notification ring on said first telephone line; and
    forwarding said call to a second telephone line.

2. The method of claim 1, wherein providing a call forwarding notification ring includes:
    setting a timer at the telephone switch to determine when a ring has been provided to the first telephone line for a period of time which is less than six seconds.

3. The method of claim 2, further comprising:

contacting the service control point for additional call processing instructions when said timer indicates that a ring has been provided to the first telephone line for said period of time; and receiving from said service control point a call forwarding instruction including the second telephone number.

4. The method of claim 1, wherein providing a call forwarding notification ring includes:

applying a passive leg treatment with a ping-ring to said first line.

5. A call processing method, comprising:

operating a switch to detect a call directed to a first telephone;

in response to detecting a call directed to the first telephone contacting a service control point to obtain call processing instructions; and in response to call processing instructions received by the switch from the service control point, i. initiating a distinctive ring at said first telephone, the distinctive ring being different in duration or sound than a full normal ring; and ii. forwarding said call to a second telephone.

6. The call processing method of claim 5, wherein the step of initiating a distinctive ring includes:

causing the first telephone to ring for a period less than six seconds.

7. The call processing method of claim 5, wherein the step of initiating a distinctive ring includes:

operating the switch to ring the first telephone for a period of less than six seconds.

8. The call processing method of claim 7, wherein the step of initiating a distinctive ring includes:

setting a timer at said switch to detect when the first telephone has been allowed to ring for said period.

9. The call processing method of claim 5, wherein the step of initiating a distinctive ring includes:

operating the switch to perform a passive leg treatment thereby causing the first telephone to ring.

10. A method of providing call forwarding services, the method comprising:

detecting a call directed to a telephone line of a subscriber;

contacting a service control point for call processing instructions in response to detecting said call;

providing a call forwarding notification ring signal on said telephone line in response to a signal received from said service control point; and forwarding the call as a function of a telephone number provided by said service control point.

11. The method of claim 10, wherein the call forwarding notification signal is a distinctive ring.

12. The method of claim 11, wherein the distinctive ring is a ping-ring.

13. The method of claim 10, further comprising the step of:

receiving a message from the service control point instructing that a passive leg treatment should be applied to the subscriber telephone line.

14. The method of claim 10, further comprising:

receiving from the service control point information identifying which one of a plurality of possible call notification signals should be provided on the subscriber telephone line.

15. The method of claim 14, wherein said subscriber subscribes to a plurality of different call forwarding services, and wherein said call forwarding notification signal is different for calls forwarded according to different call forwarding services.

16. The method of claim 14, wherein a call may be forwarded to any one of a plurality of telephone numbers, and wherein the call forwarding notification signal for calls forwarded to a first telephone number is different than the call forwarding notification signal for calls forwarded to a second telephone number.

17. A telephone system, comprising:

a telephone switch;

a service control point coupled to the telephone switch, the service control point including a call processing record, the call processing record including call processing control information for controlling said switch to perform a call forwarding operation and to notify a call forwarding service subscriber of a forwarded call through the use of a distinctive ring signal.

18. The telephone system of claim 17, wherein the call processing record includes a next event list and a telephone number to which calls are to be forwarded, the next event list including information used to control said telephone switch to notify the call forwarding service subscriber of the forwarding of a call and to forward calls to said telephone number included in the call processing record.

* * * * *